US006759471B1

(12) United States Patent
Ukuda

(10) Patent No.: US 6,759,471 B1
(45) Date of Patent: Jul. 6, 2004

(54) OPTICAL MATERIAL AND OPTICAL SYSTEM USING IT

(75) Inventor: Hideo Ukuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 09/606,522

(22) Filed: Jun. 30, 2000

(30) Foreign Application Priority Data

Jul. 1, 1999 (JP) .......................................... 11-187678
Feb. 21, 2000 (JP) ...................................... 2000-042600

(51) Int. Cl.[7] .............................................. C68K 3/00
(52) U.S. Cl. ................................................... 524/497
(58) Field of Search .............................. 524/492, 493, 524/442, 497

(56) References Cited

U.S. PATENT DOCUMENTS 4,420,225 A  12/1983 Bömer et al.
6,229,654 B1  5/2001 Cabeza et al.

FOREIGN PATENT DOCUMENTS

| EP | 0 544 008 | 6/1993 |
|---|---|---|
| EP | 0 895 100 | 2/1999 |
| JP | 61-9262 | 3/1986 |
| JP | 04-366115 | 12/1992 |
| JP | 06-16450 | 1/1994 |
| JP | 06-032631 | 2/1994 |
| JP | 09-127321 | 5/1997 |
| JP | 11-044808 | 2/1999 |
| WO | 98/45108 | 10/1998 |

OTHER PUBLICATIONS

A.D. Kathman, et al., "Binary Optics in Lens Design," International Lens Design Conference, SPIE vol. 1354, pp. 297–309 (1990).
C. Londono, et al., "The Design of Achromatized Hybrid Diffractive Lens Systems," International Lens Design Conference, SPIE vol. 1354, pp. 30–37 (1990).
A.P. Wood, "Using Hybrid Refractive–Diffractive Elements in Infrared Petzval Objectives," International Lens Design Conference, SPIE vol. 1354, pp. 316–322 (1990).

*Primary Examiner*—Edward J. Cain
(74) *Attorney, Agent, or Firm*—Fitzpatrick, Cella, Harper & Scinto

(57) ABSTRACT

An optical material is a mixture of materials comprising a first material having a refractive index of not more than 1.45 for the d-line and a second material having an Abbe's number, indicating wavelength dispersion in the visible region, of not more than 25. A relation between the refractive index for the d-line ($n_d$) and the Abbe's number ($\nu_d$) is defined as follows:

$n_d \leq -6.667 \times 10^{-3} \nu_d + 1.70$.

24 Claims, 13 Drawing Sheets

TYPE OF MIXTURE (1) NORMAL MIXTURE (2) GUEST-HOST TYPE MIXTURE (3) BACKBONE CHAIN TYPE MIXTURE (4) SIDE CHAIN TYPE MIXTURE

… … …

OPTICAL MATERIAL AND OPTICAL SYSTEM USING IT

BACKGROUND OF THE INVENTION

1. Field of the Invention

The present invention relates to an optical material and an optical system using it and, more particularly, to a low refractive index high-dispersion optical material, for example, applicable to optical elements such as lenses, filters, mirrors, refracting optical elements, diffracting optical elements, and so on, and an optical system of optical equipment such as cameras, binoculars, microscopes, and so on, using the optical material.

2. Related Background Art

As one of conventional approaches to correction of chromatic aberration of the optical system composed of only refracting optics, there is a method of combining glass materials of different dispersion characteristics. For example, in the case of objectives of telescopes etc., axial chromatic aberration is corrected by combining a positive lens of a low-dispersion glass material with a negative lens of a high-dispersion glass material. For this reason, there were cases where chromatic aberration was not corrected adequately if the composition or the number of lenses was limited or if available glass materials were limited.

For the purpose of correction of this chromatic aberration, there are suggestions on methods of controlling the refractive index and Abbe's number in order to expand the range of the optical constants of glass materials, thereby obtaining the low-refraction high-dispersion glass materials, for example, in Japanese Patent Application Laid-Open No. 6-32631, Japanese Patent Application Laid-Open No. 61-9262, Japanese Patent Publication No. 4-33740, and so on.

On the other hand, other references, e.g. SPIE Vol. 1354 International Lens Design Conference (1990) etc., disclose methods of reducing the chromatic aberration by use of a diffracting optical element provided with a diffraction grating having diffracting action in part of a lens surface or an optical system, in contrast to the methods of reducing the chromatic aberration by the combination of glass materials.

These methods make use of the physical phenomenon in which a refracting surface and a diffracting surface in the optical system demonstrate opposite directions of occurrence of chromatic aberration against rays of a certain reference wavelength.

Further, such diffracting optical element can be provided with an aspherical-lens-like effect by changing periods of the periodic structure of the diffraction grating and is thus greatly effective to reduction of aberration.

Comparing them herein as to refraction of rays, a ray appears as one ray even after refracted by a lens surface, whereas a ray appears as a plurality of rays of plural orders after diffracted by a diffractive surface.

When the diffracting optical element is used as a lens system, it is thus necessary to determine the grating Structure so as to concentrate light of the used wavelength range into specific orders (which will also be referred to hereinafter as "designed orders") by adequately enhancing the diffraction efficiency of rays of the designed orders. When light is concentrated in the specific orders, the intensity of rays of diffracted light of the other orders is low. When the intensity is zero, diffracted light thereof appears null. If there exist rays of diffraction orders other then the designed orders, they will be focused at positions different from those of the rays of the designed orders and appear as flare light.

The layouts capable of reducing this decrease of diffraction efficiency are presented in Japanese Patent Application Laid-Open No. 9-127321 and Japanese Patent Application Laid-Open No. 11-44808. The layouts realize high diffraction efficiency in a wide wavelength range by optimizing dispersion properties and thicknesses of gratings of materials different from each other.

Specifically, they disclose the diffracting optical elements wherein a plurality of optical materials (layers) are stacked on a substrate and wherein the diffraction grating is formed in the step shape, kinoform, or binary shape resulting from approximation thereof to the step shape, or the like in at least one of interfaces between the mutually different optical materials.

In each of the diffracting optical elements described in Japanese Patent Application Laid-Open No. 09-127321 and Japanese Patent Application Laid-Open No. 11-44808, the combination of a relatively high-refraction low-dispersion material with a relatively low-refraction high-dispersion material is used in order to obtain the layout having the high diffraction efficiency in the wide wavelength range. Specifically, the materials used are as follows: BMS81 ($n_d$=1.64, $v_d$=60.1: available from Ohara Inc.) and the plastic optical material PC ($n_d$=1.58, $v_d$=30.5: available from Teijin Chemicals Ltd.) in the case of Japanese Patent Application Laid-Open No. 9-127321; COO1 ($n_d$=1.5250, $v_d$=50.8: available from Dainippon Ink and Chemicals, Inc.), the plastic optical material PC ($n_d$=1.58, $v_d$=30.5: available from Teijin Chemicals Ltd.), BMS81 ($n_d$=1.64, $v_d$=60.1: available from Ohara Inc.) etc. In the case of Japanese Patent Application Laid-Open No. 11-44808.

For further enhancing the optical performance of the aforementioned diffracting optical elements, we investigated the optical materials commercially available, or the optical materials under research and development and obtained the distribution as illustrated in FIG. 1.

The materials of the stack diffracting optical elements described in the Japanese Patent Applications Laid-Open No. 9-127321 and Laid-Open No. 11-44808 also fall in the distribution of FIG. 1.

As for the materials suggested in the aforementioned Japanese Patent Applications Laid-Open No. 6-32631 and Laid-Open No. 61-9262 and Japanese Patent [Publication No. 4-33740] Publication Laid-Open No. 6-16450, their refractive indexes and refractive-index dispersions are ($n_d$= 1.585 to 1.660, $v_d$=40.5 to 32.5), ($n_d$=1.5945 to 1.6925, $v_d$=27.3 to 36.6), and ($n_d$=1.55 to 1.65, $v_d$=27 to 35), respectively, and these materials also fall in the distribution of the existing substances of FIG. 1.

It is seen that 2-ethozy-ethyl methacrylate ($n_d$=1.483, $v_d$=32) seems only one material with low refractive index and high dispersion and that there have been few such materials developed.

SUMMARY OF THE INVENTION

An object of the present invention is to provide an optical material with low refractive index and high dispersion, which was not known heretofore, and an optical system using it.

A first aspect of the present invention is an optical material which is a mixture of materials comprising a first material having a refractive index of not more than 1.45 for the d-line and a second material having an Abbe's number, indicating wavelength dispersion in the visible region,.of not more than 25, wherein a relation between the refractive index for the d-line ($n_d$) and the Abbe's number ($v_d$) indicating the wavelength dispersion in the visible region is defined as follows:

$$n_d \leq -6.667 \times 10^{-3} v_d + 1.70.$$

A second aspect of the invention is the optical material of the first aspect wherein said Abbe's number ($v_d$) indicating the wavelength dispersion in the visible region is less than 40.

A third aspect of the invention is the optical material of the first aspect or the second aspect wherein said second material comprises particles having the grain size in the range of 2 to 100 nm.

A fourth aspect of the invention is the optical material of the first aspect, the second aspect, or the third aspect wherein said first material is an amorphous fluororesin.

A fifth aspect of the invention is the optical material of either one of the first to fourth aspects wherein said second material is particles of a composite metal oxide of titanium and silicon ($Si_x$—$Ti_{(1-x)}O_2$ having the Abbe's number ($v_d$) of 24.4.

A sixth aspect of the invention is the optical material of either one of the first to fifth aspects wherein said first material is an amorphous fluororesin, said second material is particles of a composite metal oxide of titanium and silicon ($Si_x$—$Ti_{(1-x)}O_2$ having the Abbe's number ($v_d$) of 24.4, and a weight ratio of the particles and said amorphous fluororesin is in the range of 45:100 to 75:100.

A seventh aspect of the invention is the optical material of the first aspect, the second aspect, or the inthird aspect wherein said first material is a dimethylsilicone resin.

An eighth aspect of the invention is the optical material of either one of the first to third aspects and the seventh aspect wherein said second material comprises particles of titanium oxide ($TiO_2$).

A ninth aspect of the invention is the optical material of the first aspect, the second aspect, or the third aspect wherein said first material is a dimethylsilicone resin, said second material is particles of titanium oxide ($TiO_2$), and a weight ratio of the titanium oxide and said dimethylsilicone resin is in the range of 18:100 to 70:100.

A tenth aspect of the invention is an optical material wherein a relation between a refractive index for the d-line ($n_d$) and an Abbe's number ($v_d$) indicating wavelength dispersion in the visible region satisfies the following condition:

$$n_d \leq -0.01 v_d + 1.70.$$

An eleventh aspect of the invention is an optical material which is a mixture of materials comprising a first material having a refractive index of not more than 1.40 for the d-line and a second material having an Abbe's number, indicating wavelength dispersion in the visible region, of not more than 15, wherein a relation between the refractive index for the d-line ($n_d$) and the Abbe's number ($v_d$) indicating the wavelength dispersion in the visible region is defined as follows:

$$n_d \leq -0.01 v_d + 1.70.$$

A twelfth aspect of the invention is the optical material of the tenth aspect or the eleventh aspect wherein said Abbe's number ($v_d$) indicates the wavelength dispersion in the visible region is not more than 40.

A thirteenth aspect of the invention is the optical material of the eleventh aspect wherein said second material comprises particles having the grain size in the range of 2 to 100 nm.

A fourteenth aspect of the invention is the optical material of the eleventh aspect or the thirteenth aspect wherein said first material comprises an amorphous fluororesin.

A fifteenth aspect of the invention is the optical material of the eleventh aspect, the thirteenth aspect, or the fourteenth aspect wherein said second material comprises particles of titanium oxide ($TiO_2$).

A sixteenth aspect of the invention is the optical material of the eleventh aspect, the thirteenth aspect, the fourteenth aspect, or fifteenth aspect wherein said first material is an amorphous fluororesin, said second material is particles of titanium oxide ($TiO_2$), and a weight ratio of the titanium oxide and said amorphous fluororesin is in the range of 7:100 to 90:100.

A seventeenth aspect of the invention is an optical material which is a mixture of materials comprising a first material having a refractive index for the d-line in the range of 1.45 to 1.55 both inclusive and a second material having an Abbe's number, indicating wavelength dispersion in the visible region, of not more than 10, wherein a relation between the refractive index for the d-line ($n_d$) and the Abbe's number ($v_d$) is defined as follows:

$$n_d \leq -6.667 \times 10^{-3} v_d + 1.70.$$

An eighteenth aspect of the invention is the optical material of the seventeenth aspect wherein said Abbe's number ($v_d$) indicates the wavelength dispersion in the visible region is not more than 40.

A nineteenth aspect of the invention is the optical material of the seventeenth aspect or the eighteenth aspect wherein said second material comprises particles having the grain size in the range of 2 to 100 nm.

A twentieth aspect of the invention is the optical material of the seventeenth aspect, the eighteenth aspect or the nineteenth aspect wherein said second material is ITO (indium-tin-oxide).

A twenty-first aspect of the invention is the optical material of either one of the seventeenth to twentieth aspects wherein said first material is polymethyl methacrylate.

A twenty-second aspect of the invention is the optical material of either one of the seventeenth to twenty-first aspects wherein said first material is polymethyl methacrylate, said second material is particles of ITO (indium-tin-oxide), and a weight ratio of the particles and said polymethyl methacrylate is in the range of 30:100 to 250:100.

A twenty-third aspect of the invention is the optical material of either one of the seventeenth to twentieth aspects wherein said first material is an amorphous polyolefin.

A twenty-fourth aspect of the invention is the optical material of either one of the seventeenth to twentieth aspects wherein said first material is an amorphous polyolefin, said second material is particles of ITO (indium-tin-oxide), and a weight ratio of the particles and said amorphous polyolefin is in the range of 44:100 to 150:100.

A twenty-fifth aspect of the invention is the optical material of either one of the seventeenth to twentieth aspects wherein said first material is a copolymer of methyl methacrylate and styrene.

A twenty-sixth aspect of the invention is the optical material of either one of the seventeenth to twentieth aspects wherein said first material is a copolymer resin of methyl methacrylate and styrene, said second material is particles of ITO (indium-tin-oxide), and a weight ratio of the particles and said copolymer resin is in the range of 43:100 to 140:100.

A twenty-seventh aspect of invention is an optical member comprising the optical material as set forth in either one of the first aspect to the twenty-sixth aspect.

A twenty-eighth aspect of the invention is an optical system comprising the optical member of the twenty-seventh aspect.

A twenty-ninth aspect of the invention is a diffracting optical element using the optical material as set forth in either one of the first aspect to the twenty-sixth aspect.

A thirtieth aspect of the invention is an optical system comprising the diffracting optical element of the twenty-ninth aspect.

A thirty-first aspect of the invention is an optical device comprising the optical system of the twenty-eighth aspect or the thirtieth aspect.

A thirty-second aspect of the invention is a method for producing an optical material, comprising a step of decreasing a filling factor of a first material, and a step of filling gaps of the first material of the decreased filling factor with a second material having an Abbe's number different from that of the first material, thereby producing an optical material having a desired refractive index and Abbe's number.

A thirty-third aspect of the invention is an optical member comprising the material produced by the production method as set forth in the thirty-second aspect.

A thirty-fourth aspect of the invention is an optical system comprising the optical member of the thirty-third aspect.

A thirty-fifth aspect of the invention is the optical system of the thirty-fourth aspect wherein said optical member is a diffracting optical element.

A thirty-sixth aspect of the invention is an optical device comprising the optical system of the thirty-fourth aspect or the thirty-fifth aspect.

DETAILED DESCRIPTION OF THE PREFERRED EMBODIMENTS

Embodiments of the optical materials according to the present invention will be described below.

Figure 1:
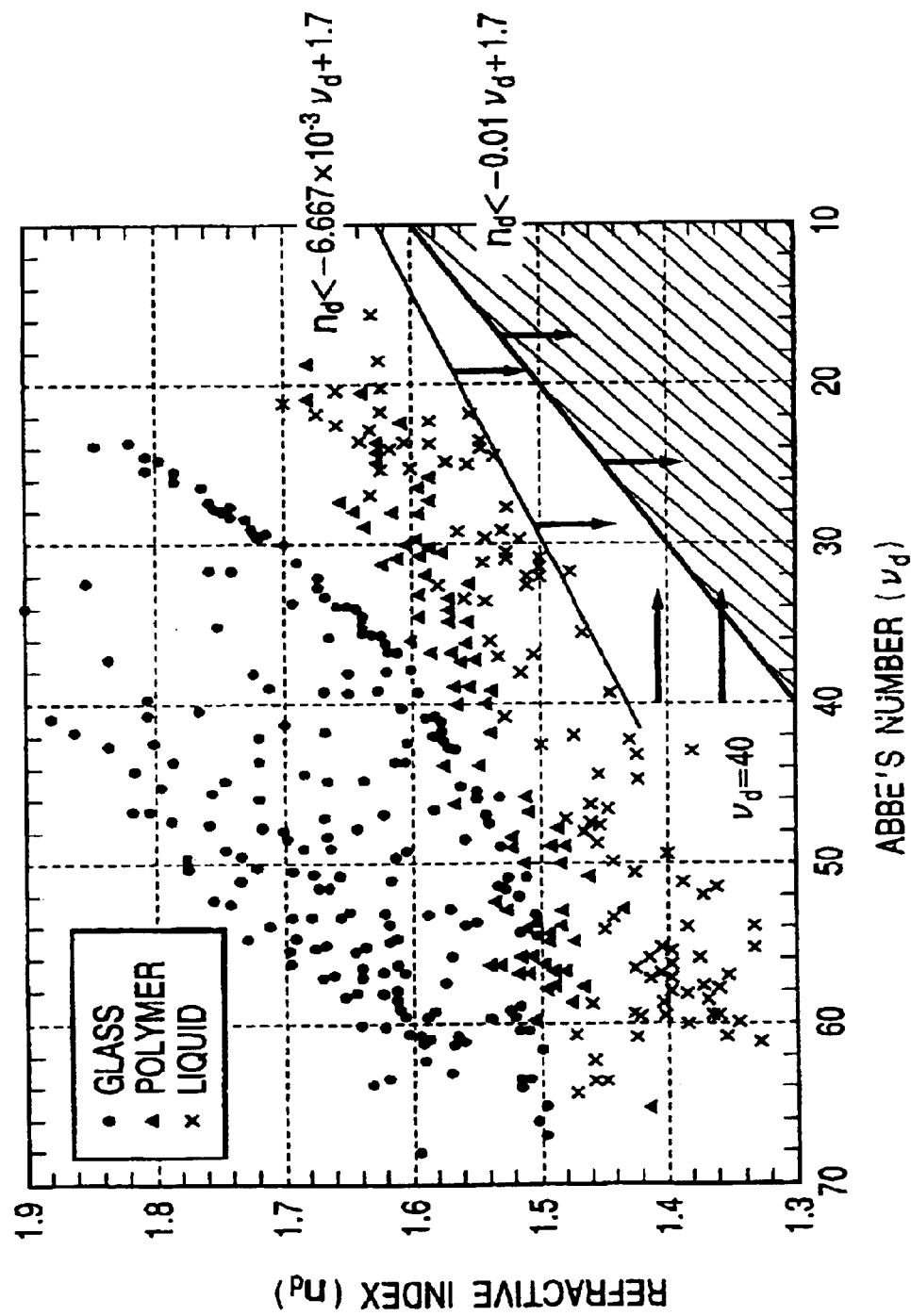
FIG. 1 is an explanatory diagram to show the relationship between refractive index and dispersion of optical materials.

In general, since a substance is composed of molecules or atoms, oscillator characteristics and density are determined by its atomic or molecular structure. For this reason, the optical constants, including the refractive index $n_d$ for the d-line (light of the wavelength 587 nm), the Abbe's number $v_d$ indicating wavelength dispersion in the visible region, etc. of the optical materials, show the distribution as illustrated in FIG. 1. The relation between refractive index n and polarization $\chi'$ of substance can be expressed by the following Equation (1).

$$n^2 = 1 + \chi' \quad \text{(Eq. 1)}$$

Figure 2:
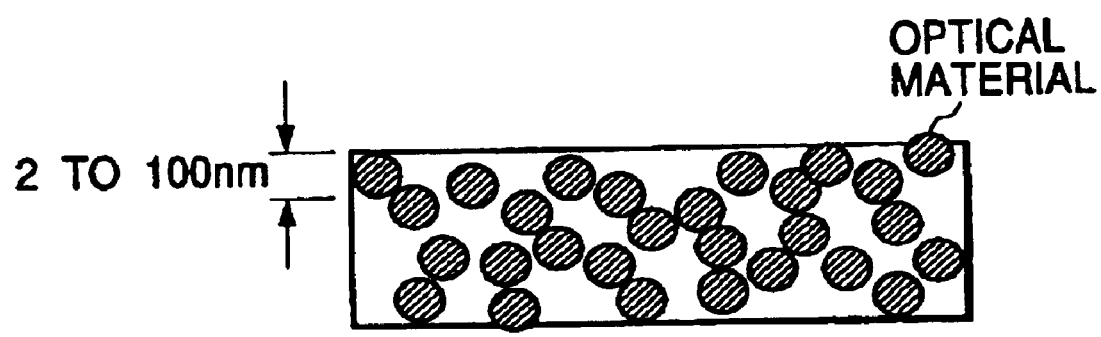
FIG. 2 is an explanatory diagram to illustrate a structure with a reduced filling factor of a substance.

Supposing particles have the size of 2 to 100 nm, the polarization characteristics inside the particles will be like those of bulk. However, in the case of a structure with a reduced filling factor of a substance as illustrated in FIG. 2, the polarization characteristics for the light in the visible wavelength range of 400 to 700 nm are of a level in which nonuniformity thereof can be ignored in an optical sense. Therefore, the structure as illustrated in FIG. 2 demonstrates the optical characteristics close to the Drude theory of Eq. (2) below.

$$n^2 = 1 + \chi'_i = 1 + T(n_1^2 - 1) \quad \text{(Eq. 2)}$$

$(0 \leq T \leq 1) n_1$: refractive index of bulk

Figure 3:
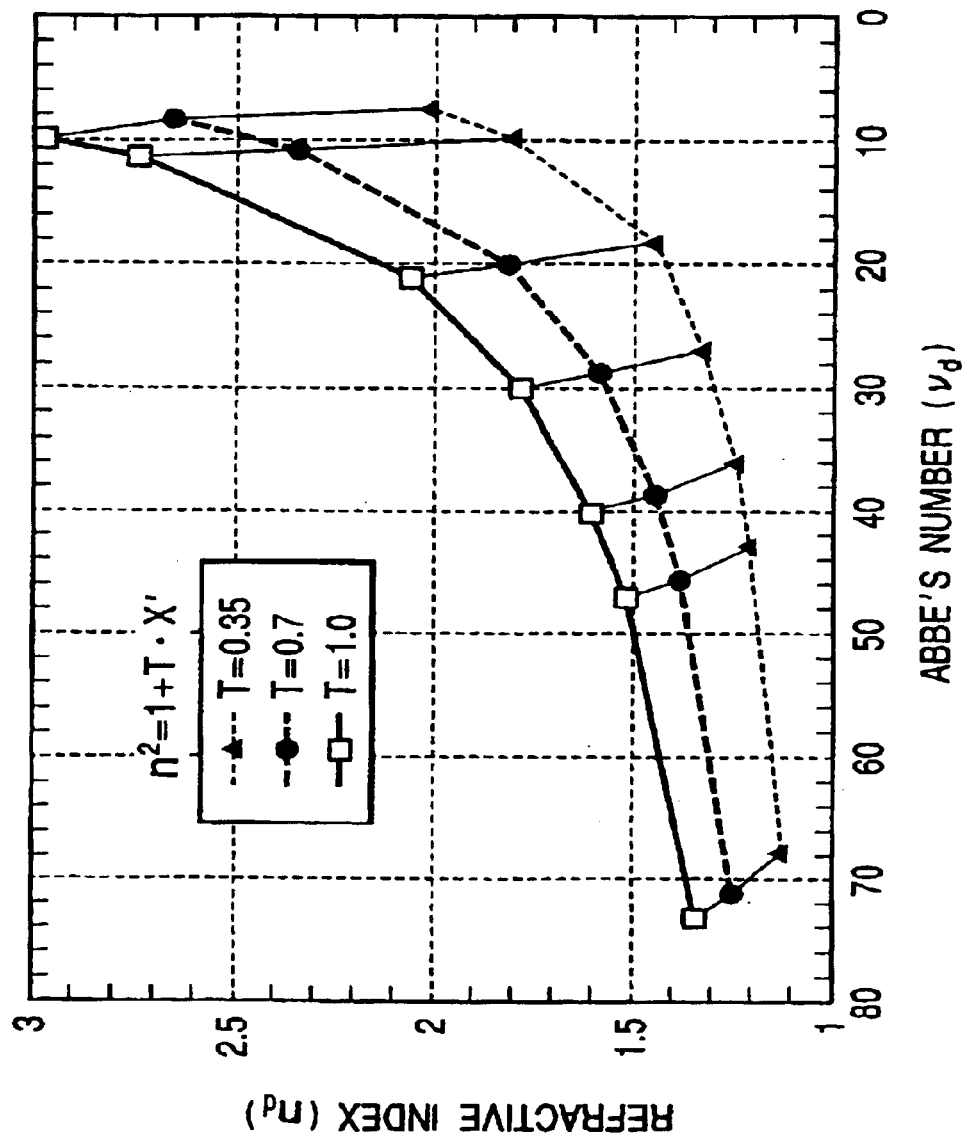
FIG. 3 is an explanatory diagram to show the relationship between refractive index and dispersion with various filling factors of a substance.

FIG. 3 is an explanatory diagram to show the relationship between refractive index nd and Abbe's number $v_d$ with various filling factors of a substance. As seen from FIG. 3, the refractive index $n_d$, and dispersion $v_d$ vary as indicated by curves S1, S2, S3, and with variation in apparent density by changing the filling factors, the refractive index demonstrates change while the Abbe's number change little. Therefore, a substance can be prepared in the region of $(n_d \leq -6.667 \times 10^{-3} v_d + 1.70, v_d \leq 40, \text{ and } n_d \leq 0.01 v_d + 1.70, v_d < 40)$ by decreasing the refractive index in the structure of FIG. 2.

When an antireflection film is formed on a surface of a lens by vapor deposition or the like, the filling factor of the film is lowered depending upon conditions of deposition and the structure becomes as illustrated in FIG. 2, whereby the refractive index of the material with large wavelength dispersion (small Abbe's number $v_d$) is decreased to some extent.

Figure 4:
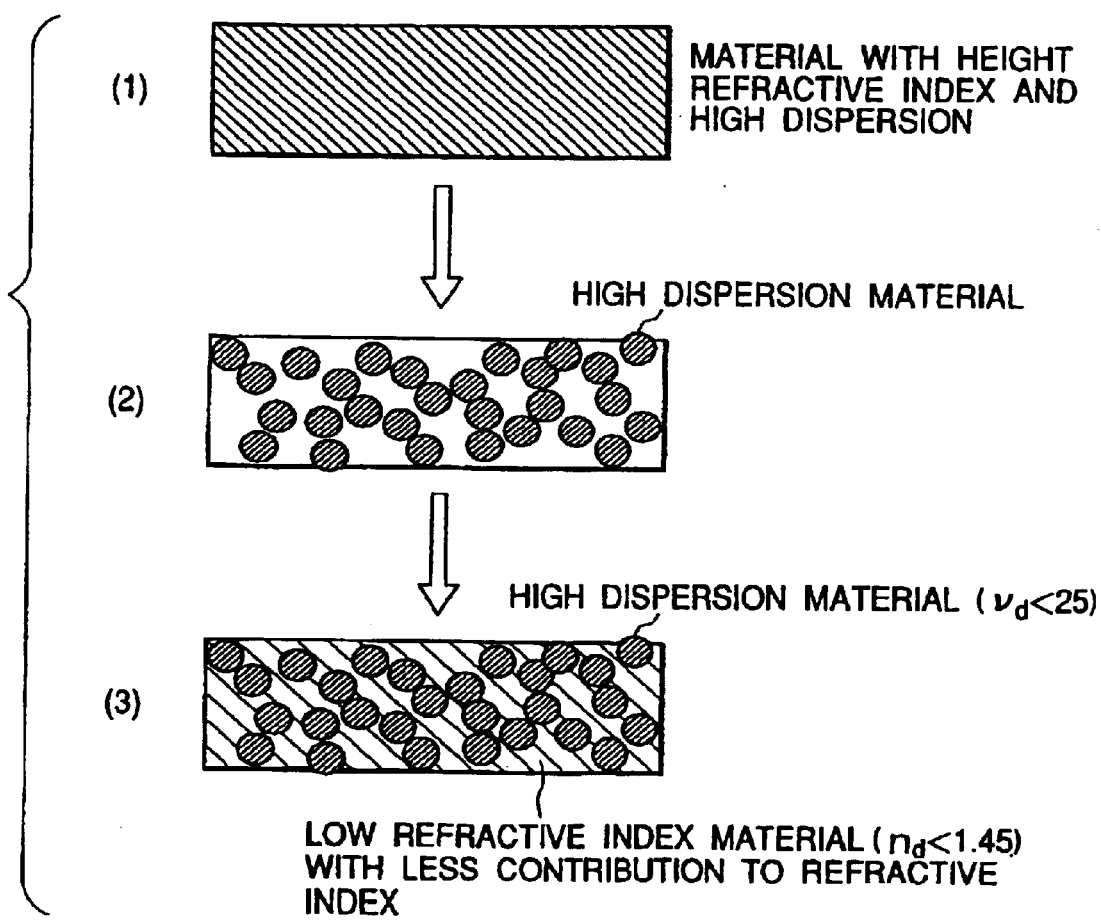
FIG. 4 is an explanatory diagram to explain dispersion of a high dispersion material into a low index material.

However, if the filling factor of the substance is too low as in (2) of FIG. 4, there will appear such a tendency that when the substance is exposed from vacuum to the ordinary atmosphere, molecules of air and water adsorb thereto because of its porous structure, so as to impede the decrease of refractive index and increase the Abbe's number as well. In addition, the substance becomes very fragile.

Therefore, a material with a low refractive index and high dispersion (small Abbe's number) is realized by first decreasing the filling factor of the substance with large wavelength dispersion of refractive index (hereinafter referred to as "dispersion") (a high-dispersion substance) and filling gaps in this substance with another low-index substance with a small refractive index, as in (3) of FIG. 4.

Refractive indexes and Abbe's numbers were calculated according to Eq. (3) below and based on the polarizability obtained by Eq. (1), for mixtures based on the assumption that the material with high refractive index and large dispersion has $(n_d, \nu_d)=(2.74, 11.1)$, or $(3.31, 8.40)$ and the substance with low refractive index and small dispersion has $(n_d, \nu_d)=(1.29, 87.4)$, $(1.34, 73.0)$, or $(1.43, 57.5)$.

$$n^2=1+T\chi^1+(1-T)\chi^2=1+T(n_1^2-1)+(1-T)(n_2^2-1) \qquad \text{(Eq. 3)}$$

($0 \leq T \leq 1$) $n_x$: refractive index of bulk of each material.

Figure 5:
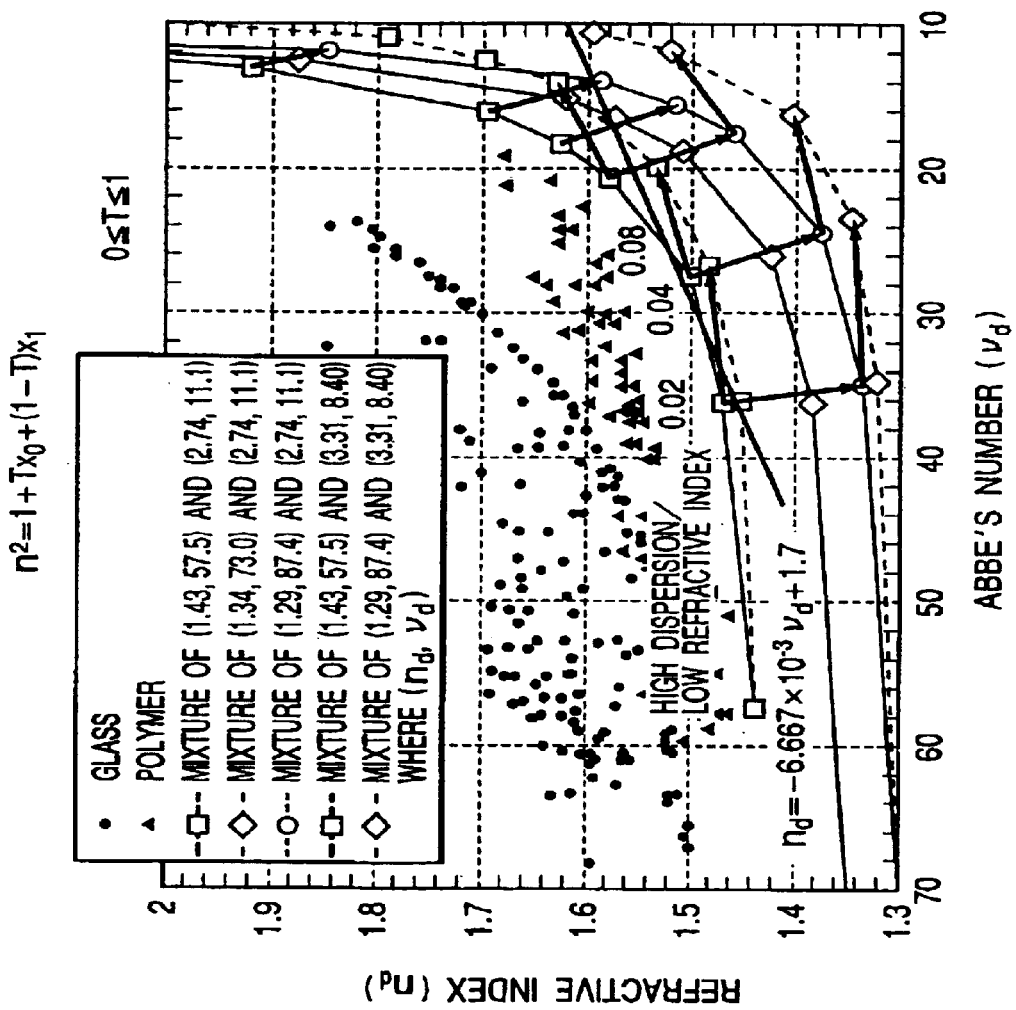
FIG. 5 is an explanatory diagram to illustrate the relationship between refractive index and dispersion in mixtures of low index materials and high dispersion materials.

The results are as illustrated in FIG. 5 and the optical materials are realized in the region of $(n_d \leq -6.667 \times 10^{-3}\nu_d + 1.70, \nu_d \leq 40)$ by mixing the low-index material $(n_d \leq 1.45)$ with the large-dispersion material (high-dispersion material, $\nu_d \leq 25$).

In this case, there is such a tendency that even in fixed proportions, the dispersion shows little change but the refractive index does a shift toward lower indexes when the high-index high-dispersion material is mixed with a lower-index material; and the refractive index demonstrates little change but the dispersion increases when the high-index high-dispersion material is mixed with a higher-dispersion material.

For mixing the large-dispersion material with the low-index material, any method may be employed as long as the size is smaller then the wavelengths of light and makes little contribution to scattering (i.e., if the size is in units not more than 100 nm).

Figure 6:
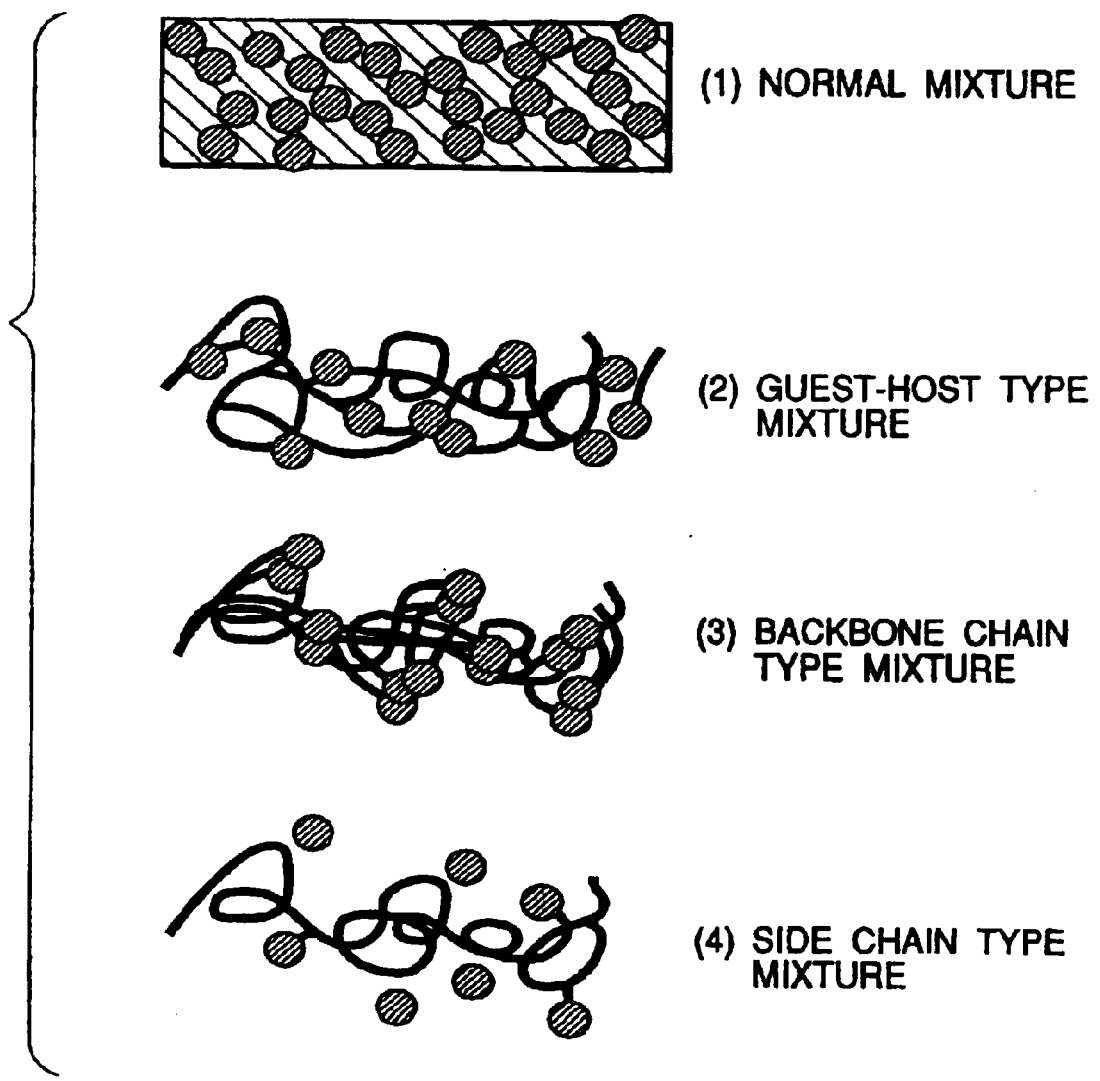
FIG. 6 is an explanatory diagram to show types of mixtures of substances.

Specifically, the following mixing ways are considered, as illustrated in FIG. 6;

where the high-dispersion material is of fine particles, (1) normal mixing; where the main chain is an organic polymer, (2) guest-host type mixing, (3) main chain type mixing, and (4) side chain type mixing.

In the case of the film formation by vacuum vapor deposition, applicable methods include two-dimensional evaporation of the large-dispersion material and the low-index material, formation of equivalent layers by depositing the respective materials in units of several nm, and so on.

However, as the units indicating high dispersion of polarizability become 2 nm or less to go into the molecular level, the environment of the high-dispersion units becomes far from the bulk state and tends to follow the Lorentz-Lorenz theory (Eq. (4)) with consideration to local electric fields, rather than the Drude theory. In this case, where the materials are mixed in fixed proportions, the dispersion tends to be lower, as compared with Eq. (3).

$$n^2=[\{C_1n_1^2/(\rho_1(n_1^2+2))\}+\{C_2n_2^2/(\rho_2(n_2^2+2))\}]/[\{C_1/(\rho_1(n_1^2+2))\}+\{C_2/(\rho_2(n_2^2+2))\}] \qquad \text{(Eq. 4)}$$

$C_x$: weight concentration, $n_x$: refractive index of bulk of each material, $\rho_x$: density in bulk of each material The blending materials can be either organic or inorganic materials if they are the material having large dispersion and the material indicating the property of low refractive index. There are no specific restrictions an the materials, but specific examples of the materials are the following materials. For the material with the low refractive index $(n_d \leq 1.45)$, examples of the organic materials are amorphous fluororesins ($n_d$=1.28 to 1.38) represented by the following chemical formula, for example.

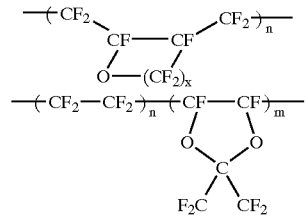

Examples of the inorganic materials are $MgF_2$ ($n_d$1.38), $CaF_2$ ($n_d$=1.44), and so on.

There are no specific restrictions on the large-dispersion material ($\nu_d \leq 25$), but specific examples thereof are $TiO_2$, ($n_d, \nu_d$=2.2652, 11.8), $Nb_2O_5$ ($n_d, \nu_d$=2.367, 14.0), ITO ($n_d, \nu_d$=1.8581, 5.53), $Cr_2O_3$ ($n_d, \nu_d$=2.2178, 13.4), $BaTiO_3$, ($n_d, \nu_d$=2.4362, 11.3), etc. and mixtures containing at least one of the forgoing materials.

The optical material in the region of $(n_d \leq -6.667 \times 10^{-3}\nu_d+1.70, \nu_d \leq 40)$ can be realized by using the low-index material of $n_d \leq 1.45$ and particles of the large-dispersion material of $\nu_d \leq 25$ in the grain size of 2 to 100 nm.

There are no specific restrictions on the low-index material, but it is desirably one of the amorphous fluororesins. The reason is that the amorphous fluororesins have low refractive indexes, are stable and less reactive, and give rise to less deviation from calculated values in the form of mixtures.

There are no specific restrictions on the material with large dispersion (i.e., with a small Abbe's number), but it is desirably particles of a composite metal oxide of titanium and silicon ($Si_x$—$Ti_{(1-x)}O_2$). The ratio of metals can be adjusted to an arbitrary value for the composite metal oxide of titanium and silicon and it is thus easy to adjust the Abbe's number. The large-dispersion material used herein is the particles of the composite metal oxide of titanium and silicon adjusted to the Abbe's number ($\nu_d$) of 24.5 $\leq$ 25.

There are no specific restrictions on the grain size of the particles of the composite metal oxide of Ti and Si ($Si_x$—$Ti_{(1-x)}O_2$) as long as it does not cause unignorable scattering of light. The grain size is desirably not more than 100 nm.

For uniformly dispersing the above particles of ($Si_x$—$Ti_{(1-x)}O_2$), for example, in the above amorphous fluororesins, it is effective to modify the surface of the particles of ($Si_x$—$Ti_{(1-x)}O_2$) by a fluorophilic group like the fluoroalkyl group.

When the mixing ratio of the fluororesin and the composite metal oxide of ($Si_x$—$Ti_{(1-x)}O_2$) is in the range of 45:100 to 75:100, the resultant optical material is one satisfying the region $(n_d \leq -6.667 \times 10^{-3}\nu_d+1.70, \nu_d \leq 40)$.

As described above, the optical material in the region $(n_d \leq -6.667 \times 10^{-3}\nu_d+1.70, \nu_d \leq 40)$ is obtained by mixing the material with the low index $(n_d \leq 1.45)$ and the material with the large wavelength dispersion of refractive index $(\nu_d \leq 25)$.

In the present embodiment the low-index high-dispersion optical material is realized as described above.

The aforementioned material, 2-ethoxy-ethyl methacrylate, is considered to be a material realizing ($n_d$=1.483, $\nu_d$=32) by decreasing the density in terms of the structure, but the structure of this 2-ethoxy-ethyl methacrylate is different from that of the optical material in the region $(n_d \leq 6.667 \times 10^{-3}\nu_d+1.70, \nu_d \leq 40)$ prepared by forming the mixture of the material with the low index $(n_d \leq 1.45)$ and the large-dispersion material ($\nu_d \leq 25$) in the present embodiment. In addition, the method with this 2-ethoxy-ethyl methacrylate provides less freedom for adjusting the levels of refractive index and wavelength dispersion than the method of the present embodiment.

As another example, the optical material is realized in the region of ($n_d \leq -0.01v_d+1.70$, $v_d \leq 40$) by using the low-index material of $n_d \leq 1.40$ and particles with $v_d \leq 15$ and in the particle size of 2 to 100 nm as the large-dispersion material.

There are no specific restrictions on the low-index material for realizing this optical material, but the low-index material is desirably one of the amorphous fluororesins. The reason is that the amorphous fluororesins have the low refractive indexes, are stable and less reactive, and thus give rise to less deviation from calculated values in the form of mixtures.

There are no specific restrictions on the large-dispersion material for realizing the above optical material, but it is desirably particles of $TiO_2$. The reason is that the $TiO_2$ particles are relatively easily available and belong to the class of materials indicating the highest dispersion out of the particles for optical use commercially available commonly.

There are no specific restrictions on the particle size of the $TiO_2$ particles as long as it does not cause unignorable scattering of light. The particle size is preferably not more than 100 nm.

For uniformly dispersing the above $TiO_2$, particles, for example, in the aforementioned amorphous fluororesins, it to effective to modify the surface of the $TiO_2$, particles by a fluorophilic group like the fluoroalkyl group.

When the mixing ratio of the fluororesin and titanium oxide ($TiO_2$) is in the range of 7:100 to 90:100, the optical material obtained satisfies the region ($n_d \leq -6.667 \times 10^{-3} v_d + 1.70$, $v_d \leq 40$); when the ratio is in the range of 90:100 to 40:100, the optical material satisfies the region ($n_d \leq -0.01v_d+1.70$, $v_d \leq 40$).

By mixing the low-index material ($n_d \leq 1.40$) with the large-dispersion material ($v_d \leq 15$) In this way, the optical material can be obtained in the region ($n_d \leq 6.667 \times 10^{-3} v_d + 1.70$, $v_d \leq 40$) or in the region ($n_d \leq -0.01v_d+1.70$, $v_d \leq 40$).

Among the materials such as $TiO_2$ ($n_d$, $v_d$=2.2652, 11.8), $Nb_2O_5$ ($n_d,v_d$=2.367, 14.0), ITO ($n_d$, $v_b$=1.8581, 5.53), $Cr_2O_3$ ($n_d$, $v_d$=2.2178, 13.4), $BaTiO_3$ ($n_d$, $v_d$=2.4362, 11.3), etc. being large-dispersion materials, ITO ($n_d$, $v_d$=1.8581, 5.53) has the Abbe's number ($v_d$) of half or less those of the other high-dispersion materials and thus demonstrates extremely high dispersion.

For that reason, as to ITO ($n_d$, $v_d$=1.8581, 5.53), even if the low-index material is a material having the index of $n_d \geq 1.45$ but $n_d \leq 1.55$, the resultant optical material satisfies the region of ($n_d \leq -6.667 \times 10^{-3} v_d + 1.70$, $v_d \leq 40$).

The mixing material as the substance of $n_d \leq 1.55$ can be selected from the general-purpose optical materials as typified by polymethyl methacrylate (hereinafter referred to as PMMA; $n_d$=1.48), amorphous polyolefin (hereinafter referred to as APO; $n_d$=1.525), some of copolymers of methyl methacrylate and styrene (hereinafter referred to as MS; $n_d$=1.53 to 1.571), and so on.

Since ITO is an electrically conductive substance, it can also reduce adhesion of dust to the lens surface due to charging specific to the optical resins for optical use.

Since ITO shows absorption in the ultraviolet region, it acts as a UV absorber and thus relieves deterioration of the resin due to ultraviolet rays.

The optical material in the region of ($n_d \leq 6.667 \times 10^{-3} v_d + 1.70$, $v_d \leq 40$) can be realized by using the material of $1.45 \leq n_d \leq 1.55$ as the low-index material and using the particles having $v_d \leq 10$ and the particle size of 2 to 100 nm as the large-dispersion material.

There are no specific restrictions on the low-index material for realizing this optical material, but it can be one of the general-purpose optical resins such as PMMA ($n_d$=1.48), APO ($n_d$=1.525), some of MS ($n_d$=1.533; the refractive index differs depending upon the copolymerization ratio of methyl methacrylate and styrene monomers), and so on.

The high-dispersion material for realizing the above optical material is desirably ITO ($n_d$, $v_d$=1.8581, 5.53). The reason is that there is no other material having the Abbe's number of not more than 10 in the visible region (light of 400 to 700 nm) than ITO ($n_d$, $v_d$=1.8581, 5.53).

There are no specific restrictions on the particle size of the particles of ITO ($n_d$, $v_d$=1.8581, 5.53) as long as it does not affect the scattering of light. However, the particle size is desirably not more than 100 nm.

For uniformly dispersing the above ITO particles, for example, in PMMA ($n_d$=1.48), APO ($n_d$=1.525), and some of MS ($n_d$=1.533) described above, it is effective to modify the surface of the ITO particles with an alkyl group having the nature of being compatible with A low-index high-dispersion optical material satisfying the region ($n_d \leq 6.667 \times 10^{-3} v_d + 1.70$, $v_d \leq 40$) can be obtained in either of the following cases: where the mixing ratio of PMMA and ITO ($n_d$, $v_d$=1.8581, 5.53) is in the range of 30:100 to 250:100; where the mixing ratio of APO ($n_d$=1.525) and ITO ($n_d$, $v_d$=1.8581, 5.53) is in the range of 44:100 to 150:100; where the mixing ratio of MS ($n_d$=1.533) and ITO ($n_d$, $v_d$=1.8581, 5.53) is in the range of 43:100 to 140:100.

Since ITO is the electroconductive material, the chargeability of the above optical materials is also reduced.

The aforementioned material of 2-ethoxy-ethyl methacrylate is the material realizing ($n_d$=1.483, $v_d$=32) by decreasing the density in terms of the structure, but the structure thereof is different from the structure of the present optical materials in the range ($n_d \leq -6.667 \times 10^{-3} v_d + 1.70$, $v_d \leq 40$) formed by mixing the low-index material ($n_d \leq 1.55$) with the large-dispersion material ($v_d \leq 10$). In addition, the method with 2-ethoxy-ethyl methacrylate provides less freedom for adjusting the levels of refractive index and index dispersion than the method of the present embodiment.

Specific examples of the optical materials according to the present invention will be described below.

EXAMPLE 1

The particles of $Si_x$—$Ti_{(1-x)}O_2$, the surface of which was modified with a fluorine surfactant according to [Method 1] described hereinafter and the refractive index and the index dispersion of which were adjusted to ($n_d$, $v_d$)=(1.703, 24.4), and the amorphous fluororesin ($n_d$=1.29) represented by the chemical formula below, were mixed at the weight ratios of $Si_x$—$Ti_{(1-x)}O_2$:amorphous fluororesin=18.3:100, 41.1:100, 70.5:100, and 88.5:100 in a fluorine solvent [the molecular structure of $(C_4F_9)_3N$], which was a solvent in which the amorphous fluororesin was soluble.

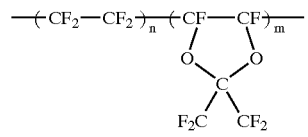

The percentage of the amorphous fluororesin to the solvent was 4%. A coating of each of the above solutions was formed on a substrate of BK7 of Φ45×2t by a dip coat method and was heated in a furnace at 180 C. for 20 minutes to obtain a film of the mixture of the amorphous fluororesin and the particles of $Si_x$—$Ti_{(1-x)}O_2$.

The refractive index and dispersion of the above mixture films were measured by a spectral ellipsometer (VASE: available from J. A. Woollam. Co., Inc.).

The two-side (front side and back side) reflectance and transmittance of the above mixture films were measured by a spectrophotometer (U4000: available from Hitachi, Ltd.).

Using measurements of the reflectance and transmittance of the above mixture films, absorption-scattering (rate) was calculated according to the equation below.

absorption-scattering (rate)=1−(two-side reflectance)−(transmittance).

Figure 9:
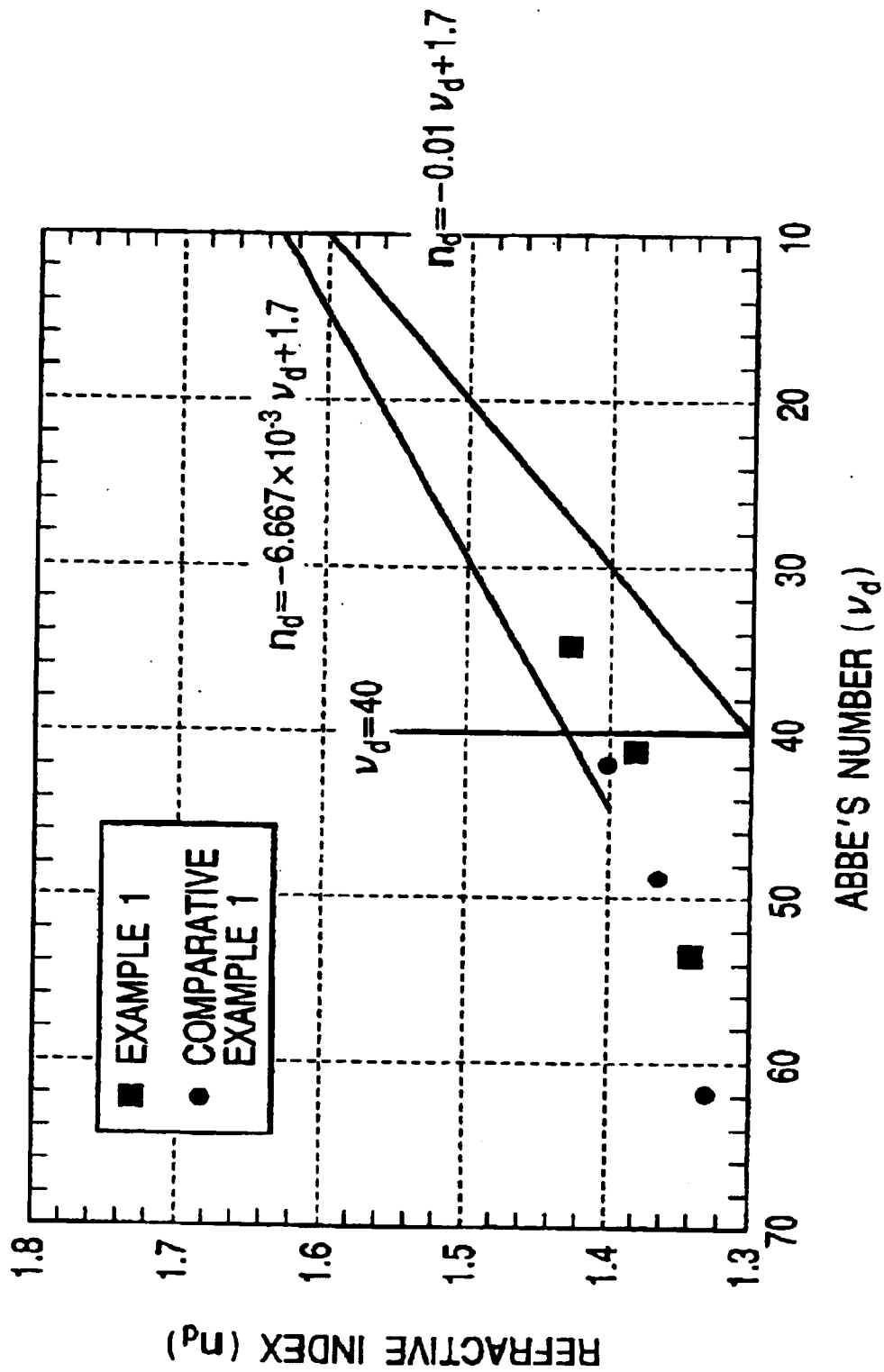
FIG. 9 is a diagram to show the relationship between refractive index and dispersion in Example 1 and Comparative Example 1.

The results of the refractive index and dispersion are presented in Table 1 and FIG. 9.

The mixtures at the ratios of $Si_x$—$Ti_{(1-x)}O_2$: amorphous fluororesin=18.3:100 and 41.1:100 had the refractive index and dispersion of $n_d$, $v_d$)=1.337, 53.9) and (1.383, 41.0), respectively, and were off the region of $n_d \leq -6.667 \times 10^{-3} v_d + 1.70$, $v_d \leq 40$. However, since the absorption-scattering (rate) of the mixtures is not more than 0.01, they can be used as optical film without problems.

The mixture at the ratio of $Si_x$—$Ti_{(1-x)}O_2$:amorphous fluororesin=70.5:100 had the refractive index and dispersion of $(n_d, v_d)$=(1.427, 34.9), and was present within the region of $n_d \leq -6.667 \times 10^{-3} v_d + 1.70$, $v_d \leq 40$. The absorption-scattering (rate) thereof was not more than 0.01, and the mixture can be used as an optical film without problems.

The mixture at the ratio of $Si_x$—$Ti_{(1-x)}O_2$:amorphous fluororesin=88.5:100 showed great scattering with the absorption-scattering (rate) of 0.04 and the refractive index and index dispersion thereof were unmeasurable.

[Method 1] Preparation of solution in which particles of $Si_x$—$Ti_{(1-x)}O_2$ modified with fluorine base surfactant were dispersed.

4 g of a fluorine-based surfactant, N-(3-(trimethoxysilyl)propyl)-N-propylperfluorooctanesulfonamide, was added to a solution containing 20 g of particles of $Si_x$—$Ti_{(1-x)}O_2$ (5 to 20 nm) in 500 g of 2, 2, 3, 3, 3-pentafluoro-1-propanol, and thereafter the mixture was put into 0.21 ml of 1N hydrochloric acid. The mixture was agitated at 25° C. for 24 hours to modify the surface of the particles. After that, 250 g of the fluorine solvent [the molecular structure of $(C_4F_9)_3N$] was added to the mixture and fractional distillation was conducted at 90° C. to remove the pentafluoro propanol and isopropanol etc. made by hydrolysis, thereby obtaining the fluorine solvent solution in which the particles of $Si_x$—$Ti_{(1-x)}O_2$ were dispersed.

Comparative Example 1

In contrast to Example 1, the particles of $Si_x$—$Ti_{(1-x)}O_2$ with the refractive index and dispersion of $(n_d, v_d)$=(1.636, 29.1) were used and the index dispersion of the high-dispersion material was $v_d > 25$.

The particles of $Si_x$—$Ti_{(1-x)}O_2$, the surface of which was modified with the fluorine surfactant according to [Method 1] described above and the refractive index and the index dispersion of which were adjusted to $(n_d, v_d)$=(1.636, 29.1), and the amorphous fluororesin ($n_d$=1.29) represented by the chemical formula below, were mixed at the weight ratios of $Si_x$—$Ti_{(1-x)}O_2$:amorphous fluororesin=17.3:100, 38.9:100, 66.7:100, and 83.8:100 in the fluorine solvent [the molecular structure of $(C_4F_9)_3N$], which was a solvent in which the amorphous fluororesin was soluble.

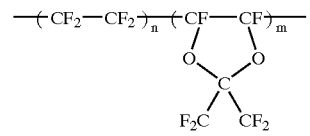

The percentage of the amorphous fluororesin to the solvent was 4%. A coating of each of the above solutions was formed on the substrate of BK7 of Φ49×2t by the dip coat method and was heated in the furnace at 180 C. for 20 minutes to obtain a film of the mixture of the amorphous fluororesin and the particles of $Si_x$—$Ti_{(1-x)}O_2$.

The refractive index and dispersion of the above mixture films were measured by the spectral ellipsometer (VASE: available from J. A. Woollam. Co., Inc.).

The two-side reflectance and transmittance of the above mixture films were measured by the spectrophotometer (U1000: available from Hitachi, Ltd.).

Using measurements of the reflectance and transmittance of the above mixture films, the absorption-scattering (rate) was calculated according to the equation below.

absorption-scattering (rate)=1−(two-side reflectance)−(transmittance).

The results of the refractive index and dispersion are presented in Table 1 and FIG. 9.

The mixture at the ratio of $Si_x$—$Ti_{(1-x)}O_2$:amorphous fluororesin=83.8:100 demonstrated large scattering with the absorption-scattering (rate) of 0.04 and the refractive index and index dispersion thereof were unmeasurable.

The refractive index and index dispersion of the mixtures at the ratios of $Si_x$—$Ti_{(1-x)}O_2$:amorphous fluororesin= 17.3:100, 38.9:100, and 66.7:100 were $(n_d, v_d)$=(1.329, 62.1), (1.366, 48.9), and (1.403, 42.1), respectively, and none of them existed in the region of $n_d \leq -6.667 \times 10^{-3} v_d + 1.70$, $v_d \leq 40$.

EXAMPLE 2

The present example was different from Example 1 in that the $TiO_2$ particles with the refractive index and dispersion of $(n_d, v_d)$=(2.2652, 11.8) were used instead of the particles of $Si_x$—$Ti_{(1-x)}O_2$.

The particles of $TiO_2$, the surface of which was modified with the fluorine surfactant according to [Method 2] described hereinafter, and the amorphous fluororesin ($n_d$= 1.29) represented by the chemical formula below, were mixed at the weight ratios of $TiO_2$: amorphous fluororesin= 4.5:100, 9.3:100, 19:100, 39:100, 74:100, and 120:100 in the fluorine solvent [the molecular structure of $(C_4F_9)$], which was the solvent in which the amorphous fluororesin was soluble.

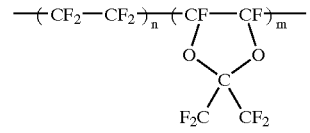

The percentage of the amorphous fluororesin to the solvent was 4%. A coating of each of the above solutions was formed on the substrate of BK7 of Φ49×2t by the dip coat method and was heated in the furnace at 180° C. for 20 minutes to obtain a film of the mixture is of the amorphous fluororesin and the particles of $TiO_2$.

The refractive index and dispersion of the above mixture films were measured by the spectral ellipsometer (VASE: available from J. A. Woollam. Co., Inc.).

The two-side reflectance and transmittance of the above mixture films were measured by the spectrophotometer (U4000: available from Hitachi, Ltd.).

Using measurements of the reflectance and transmittance of the above mixture films, the absorption-scattering (rate) was calculated according to the equation below.

absorption-scattering (rate)=1−(two-side reflectance)−(transmittance).

Figure 10:
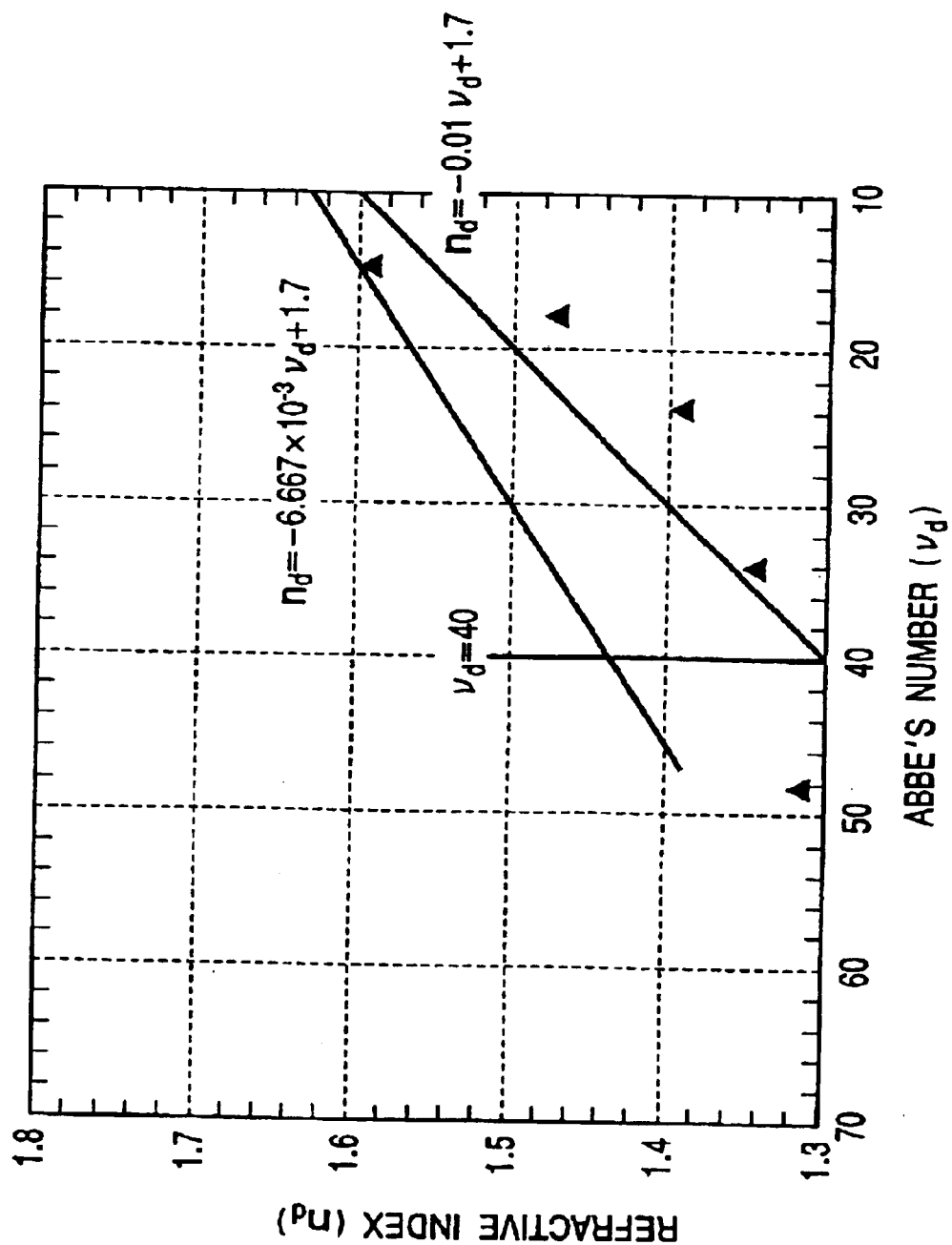
FIG. 10 is a diagram to show the relationship between refractive index and dispersion in Example 2.

The results of the refractive index and dispersion are presented in Table 2 and FIG. 10.

The mixture at the ratio of $TiO_2$:amorphous fluororesin= 4.5:100 had the refractive index and dispersion of $(n_d, v_d)$=(1.317, 48.3), and was off the region of $n_d \leq -6.667 \times 10^{-3} v_d + 1.70$, $v_d \leq 40$. The mixture had the absorption-scattering (rate) of not more than 0.01 and thus can be used as an optical film without problems.

The mixtures at the ratios of $TiO_2$:amorphous fluororesin=9.3:100, 19:100, 39:100, and 74:100 had the reflective index and dispersion of $(n_d, V_d)$=(1.343, 34.2), (1.394, 23.8), (1.478, 17.8), and (1.591, 14.8), respectively, and were within the region of $n_d \leq -6.667 \times 10^{-3} v_d + 1.70$, $v_d \leq 40$. They had the absorption-scattering (rates) of not more than 0.01 and can be used as optical films without problems.

The mixture at the ratio of $TiO_2$:amorphous fluororesin= 120:100 demonstrated great scattering with the absorption-scattering (rate) of 0.06 and the refractive index and dispersion were unmeasurable.

In this Example 2, when compared with Example 1, the region of $n_d \leq -6.667 \times 10^{-3} v_d + 1.70$, $v_d \leq 40$ can be realized in the range of weight ratios of ($TiO_2$:amorphous fluororesin=)7:100 to 90:100 and, further, the region of $n_d \leq -0.01 \times 10^{-3} v_d + 1.70$, $v_d \leq 40$ is also realized thereby.

[Method 2] Preparation of solution in which particles of $TiO_2$ modified with fluorine base surfactant were dispersed.

4 g of the fluorine-based surfactant, N-3-(trimethoxysilyl)propyl)-N-propylperfluorooctanesulfonamide, was added to a solution containing 20 g of $TiO_2$ particles (5 to 20 nm) in 500 g of 2, 2, 3, 3, 3-pentafluoro-1-propanol, and thereafter 0.21 ml of 1N hydrochloric acid was added thereto. The mixture was stirred at 25° C. for 24 hours to modify the surface of the particles. After that, 250 g of the fluorine solvent [the molecular structure of $(C_4F_9)_3N$] was added thereto and fractional distillation was conducted at 90° C. to remove the pentafluoro propanol, and isopropanol etc. created by hydrolysis, thereby preparing the fluorine solvent solution in which the $TiO_2$ particles were dispersed.

Comparative Example 2

Comparative Example 2 was different from Example 2 in that a polymer with the refractive index ($n_d$=1.52) was used instead of the amorphous fluororesin ($n_d$=1.29).

The $TiO_2$ particles and PVA ($n_d$=1.52) were blended at the weight ratios of $TiO_2$:PVA=2 to 200:100 in a solution (water:MeOH=1:1). The percentage of PVA to the solvent was 4%. A coating of each of the above solutions was formed on the substrate of DK7 of Φ49×2t by the dip coat method and thereafter it was heated in the furnace at 180° C. for 20 minutes, thereby obtaining a mixture film of PVA and the $TiO_2$ particles.

The refractive index and dispersion of the above mixture films were measured by the spectral ellipsometer (VASE: available from J. A. Woollam. Co., Inc.).

The two-side reflectance and transmittance of the above mixture films were measured by the spectrophotometer (U4000: available from Hitachi, Ltd.).

Using measurements of the reflectance and transmittance of the above mixture films, the absorption-scattering (rate) was calculated according to the equation below.

absorption-scattering (rate)=1−(two-side reflectance)−(transmittance).

Figure 11:
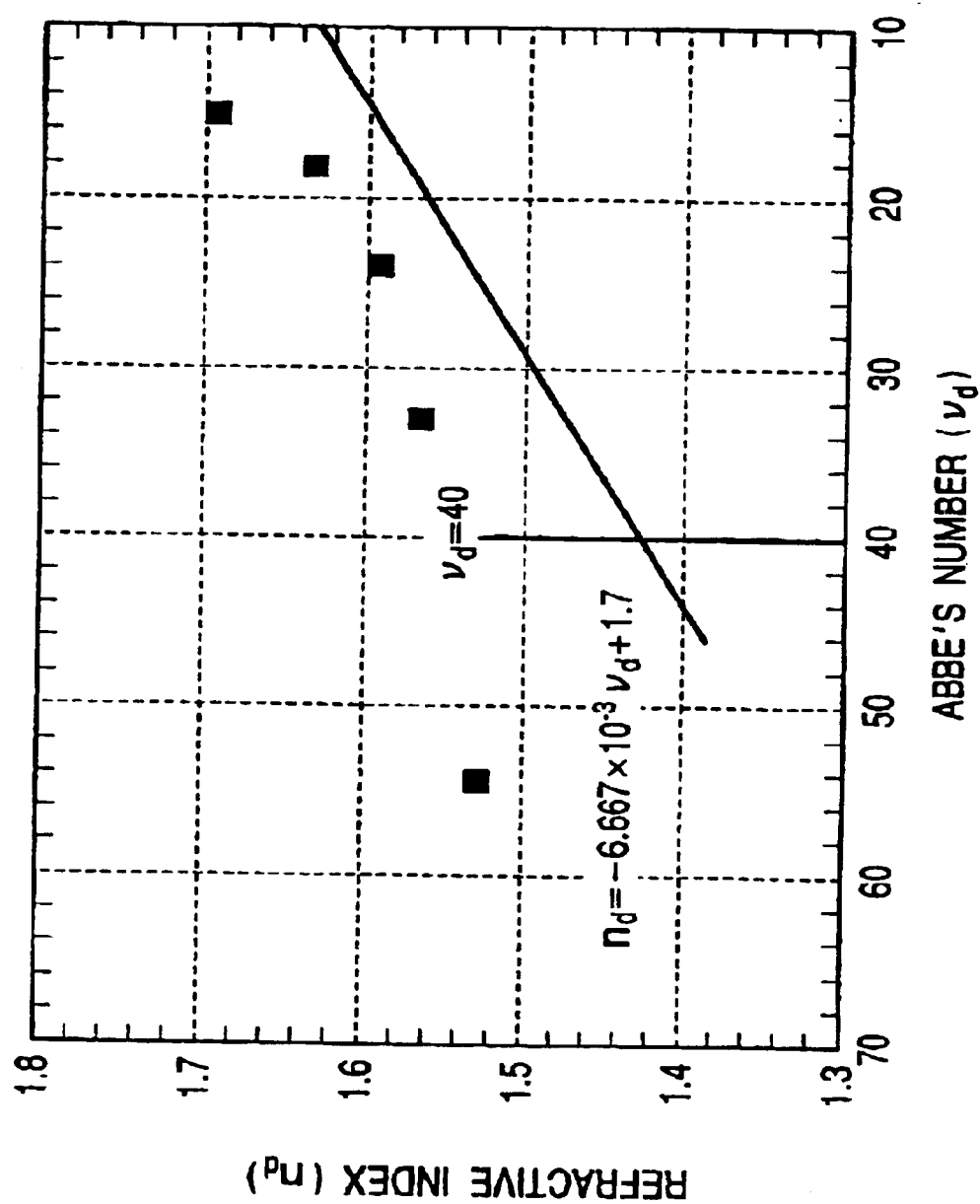
FIG. 11 is a diagram to show the relationship between refractive index and dispersion in Comparative Example 2.

The results of the refractive index and dispersion are presented in Table 3 and FIG. 11.

The refractive index and dispersion of the mixtures were $(n_d, v_d)$=(1.564, 33.0), (1.590, 23.9), (1.633, 18.1), and (1.691, 15.2), neither of which was present in the region of $n_d \leq -6.667 \times 10^{-3} v_d + 1.70$, $v_d \leq 40$.

EXAMPLE 3

Figure 7:
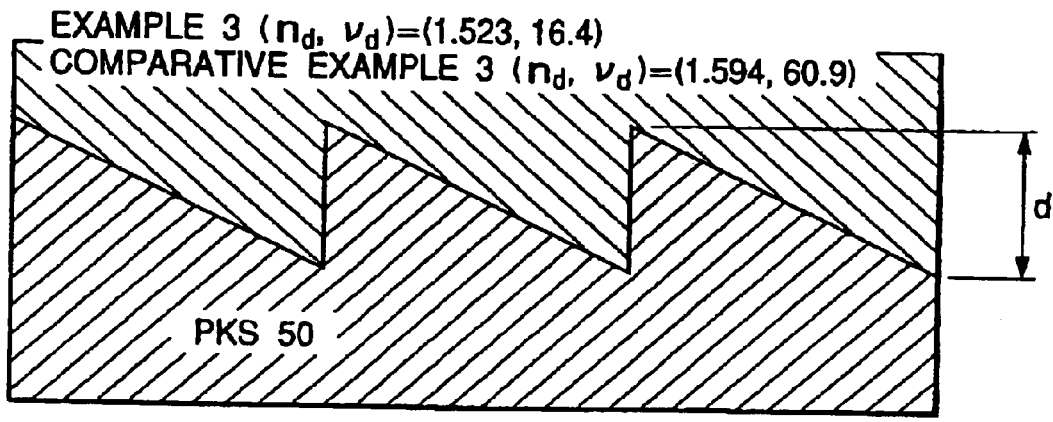
FIG. 7 is a cross-sectional view of the main part of a diffracting optical element.

The optical material adjusted to $(n_d, v_d)$=(1.523, 16.4) by mixing the amorphous fluororesin ($n_d$=1.29) represented by the chemical formula below and the $TiO_2$, particles at the weight ratio of $TiO_2$:amorphous fluororesin=51:100 as described in Example 2 was combined with PSK50: $(n_d, v_d)$=(1.5938, 60.9) available from Sumita Kogaku Kogyo, in the structure illustrated in FIG. 7.

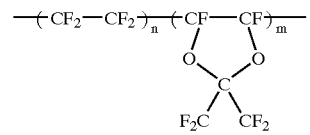

The height d of the grating was 8 μm and the diffraction efficiency was not less than 98% for the light at the wavelengths in the visible region of 400 to 700 nm. The height d of the grating is half that in Comparative Example 3 and this is advantageous in terms of forming of lens.

Comparative Example 3 p-methoxybenzyl methacrylate: $(n_d, v_d)$=(1.552, 32.5), which was a material used heretofore, was combined with PSK50: $(n_d, v_d)$=(1.5938, 60.9). The height d of the grating was 15 μm and the diffraction efficiency was not less than 98% for the light at the wavelengths in the visible region of 400 to 700 nm.

EXAMPLE 4

Particles of ITO $(n_d, v_d$=1.9581, 5.53), the surface of which was modified with an alkyl group for enhancing the compatibility with PMMA according to [Method 3] described hereinafter, and PMMA ($n_d$=1.48) were mixed at the weight ratios of ITO:PMMA=20:100, 30:100, 50:100, 120:100, 200:100, and 300:100 in methyl ethyl ketone (hereinafter referred to as MEK), which was a solvent in which PMMA was soluble. The percentage of PMMA to the solvent was 4%. A coating of each of the above solutions was formed on the substrate of BK7 of Φ49×2t by the dip coat method and thereafter heated in the furnace at 80°C. for 20 minutes, thereby obtaining a mixture film of PMMA and ITO particles.

The refractive index and dispersion of the above mixture films were measured by the spectral ellipsometer (VASE: available from J. A. Woollam. Co., Inc.).

The two-side reflectance and transmittance of the above mixture films were measured by the spectrophotometer (U4000: available from Hitachi, Ltd.).

Using measurements of the reflectance and transmittance of the above mixture films, the absorption-scattering (rate) was calculated according to the equation below.

absorption-scattering (rate)=1−(two-side reflectance)−(transmittance).

Figure 12:
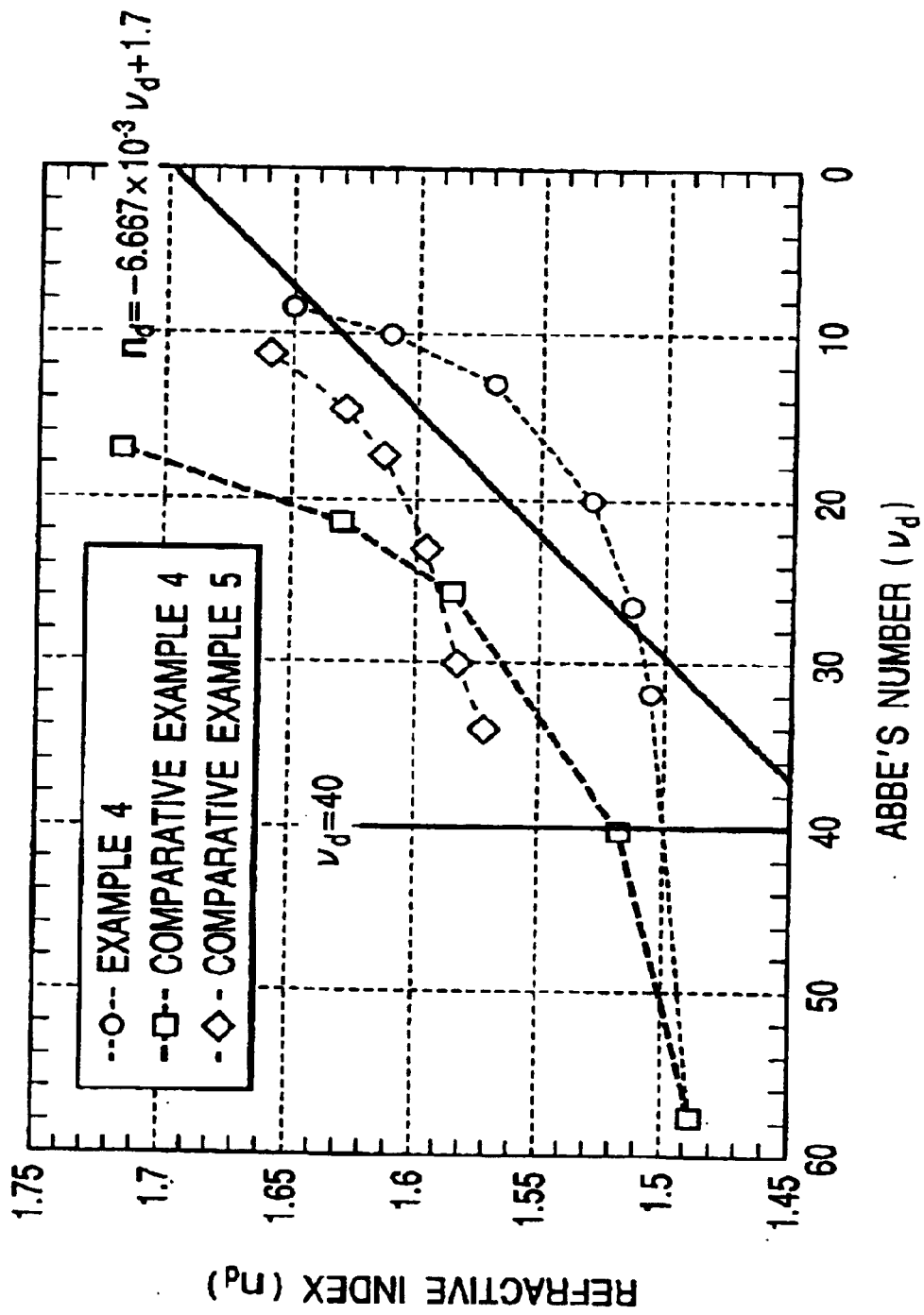
FIG. 12 is a diagram to show the relationship between refractive index and dispersion in Example 4, Comparative Example 4, and Comparative Example 5.

The results of the refractive index and dispersion are presented in Table 4 and FIG. 12.

The mixture at the weight ratio of ITO:PMMA=20:100 demonstrated the refractive index and dispersion of $(n_d, v_d)$= (1.507, 32), and was off the region of $n_d \leq -6.667 \times 10^{-3} v_d + 1.70$, $v_d \leq 40$.

The mixture had the absorption-scattering (rate) of not more then 0.01 and thus can be used as an optical film without problems.

The mixtures at the weight ratios of ITO:PMMA=30:100, 50:100, 120:100, and 200:100 had the refractive index and dispersion of $(n_d, v_d)$=(1.515, 26.6), (1.531, 20.1), (1.571, 13.2), and (1.609, 10.2), respectively, and were in the region of $n_d \leq -6.667 \times 10^{-3} v_d + 1.70$, $v_d \leq 40$.

The mixtures had the absorption-scattering (rates) of not more than 0.01 and thus can be used as optical films without problems.

The mixture at the weight ratio of ITO:PMMA=300:100 had the refractive index and dispersion of $(n_d, v_d)$=(1.647, 8.6), and was off the region of $n_d \leq 6.667 \times 10^{-3} v_d \leq 40$.

The chargeability was measured with an electrostatic voltmeter after each sample was wiped twenty times with wiping fabric (Savina Minimax: available from Kanabo Gosen K.K.). PMMA alone demonstrated the chargeability of 3 kV but the mixtures all showed no charge.

[Method 3] Preparation of solution in which the ITO articles modified with alkyl group were dispersed.

4 g of γ-methacryloxypropyltrimethoxysilane was added into a solution containing 20 g of ITO particles (5 to 20 nm) in 500 g of MEK and thereafter 0.2 ml of 1N hydrochloric acid was added thereto. The mixture was stirred at 25° C. for 24 hours to modify the surface of the particles.

Comparative Example 4

Comparative Example 4 was different from Example 4 in that the particles of $TiO_2$ $(n_d, v_d=2.2652, 11.8)$ were used and the index dispersion of the high-dispersion material was $v_d > 10$.

The $TiO_2$ particles $(n_d > 1.29)$, the surface of which was modified with an alkyl group for enhancing the compatibility with PMMA according to [Method 4] described hereinafter, and PMMA were mixed at the weight ratios of $TiO_2$:PMMA=20:100, 50:100, 85:100, and 160:100 in MEK, which was a solvent in which PMMA was soluble. The percentage of PMMA to the solvent was 4%. A coating of each of the above solutions was formed on the substrate of BK7 of Φ49×2t by the dip coat method and thereafter was heated in the furnace at 80° C. for 20 minutes, thereby obtaining a mixture film of PMMA and $TiO_2$ particles.

The two-side reflectance and transmittance of the above mixture films were measured by the spectrophotometer (U4000: available from Hitachi, Ltd.).

Using measurements of the reflectance and transmittance of the above mixture films, the absorption-scattering (rate) was calculated according to the equation below.

absorption-scattering (rate)=1−(two-side reflectance)−(transmittance).

The results of the refractive index and dispersion are presented in Table 4 and FIG. 12.

The mixtures at the weight ratios of $TiO_2$:PMMA= 20:100, 50:100, 85:100, and 160:100 had the refractive index and dispersion of $n_d, v_d$=(1.519, 40.2), (1.585, 26), (1.63, 21.7), and (1.717, 17.5), respectively, and were off the region of $n_d \leq -6.667 \times 10^{-3} v_d + 1.70$, $v_d \leq 1$.

The chargeability was measured with the electrostatic voltmeter after each sample was wiped twenty times with the wiping fabric (Savina Minimax: available from Kanebo Gosen K.K.). PMMA alone demonstrated the chargeability of 3 kV. The mixtures showed the chargeability of 1 kV to 2 kV.

[Method 4] Preparation of solution in which $TiO_2$, particles modified with alkyl group were dispersed.

4 g of γ-methacryloxypropyltrimethoxysilane was added to a solution containing 20 g of $TiO_2$ particles (5 to 20 nm) in 500 g of MEK, and thereafter 0.2 ml of 1N hydrochloric acid was added thereto. The mixture was stirred at 25° C. for 24 hours to modify the surface of the particles.

Comparative Example 5

Comparative Example 5 was different from Example 4 in that polycarbonate (hereinafter referred to as PC) with the refractive index $((n_d=1.59)$ was used instead of PMMA $((n_d=1.48)$.

The ITO particles and PC $(n_d=1.59)$ were mixed at the weight ratios of ITO:PC=20:100, 50:100, 85:100, and 160:100 in dichloroethane. The percentage of the solute to the solvent of dichloroethane was 4%. A coating of each of the above solutions was formed on the substrate of BK7 of Φ49×2t by the dip coat method and thereafter was heated in the furnace at 110° C. for 20 minutes, thereby obtaining a mixture film of PC and ITO particles.

The refractive index and dispersion of the above mixture films were measured by the spectral ellipsometer (VASE: available from J. A. Woollam. Co., Inc.).

The two-side reflectance and transmittance of the above mixture films were measured by the spectrophotometer (U4000: available from Hitachi, Ltd.).

Using measurements of the reflectance and transmittance of the above mixture films, the absorption-scattering (rate) was calculated according to the equation below.

absorption-scattering (rate)=1−(two-side reflectance)−(transmittance).

The results of the refractive index and dispersion are presented in Table 4 and FIG. 12.

The mixtures had the refractive index and dispersion of $(n_d, v_d)$=(1.596, 23.2), (1.614, 17.5), (1.628, 14.7), and (1.657, 11.4), respectively, and all were off the region of $n_d \leq -6.667 \times 10^{-3} v_d + 1.70$, $v_d \leq 40$.

The chargeability was measured with the electrostatic voltmeter after each sample was wiped twenty times with the wiping fabric (Savina Minimax: available from Kanebo Gosen K.K.). PC alone demonstrated the chargeability of 3 kV, but the mixtures all showed no charge.

EXAMPLE 5

The particles of ITO $(n_d, v_d=1.8581, 5.53)$, the surface of which was modified with an alkyl group for enhancing the compatibility with APO $(n_d=1.525)$ according to [Method 5] described hereinafter, and APO $(n_d=1.525)$ were mixed at the weight ratios of ITO:APO=25:100, 45:100, 70:100, 100:100, 135:100, and 220:100 in xylene, which was a solvent in which APO was soluble. The percentage of APO to the solvent was 4%. A coating of each of the above solutions was formed on the substrate of BK7 of Φ49×2 t by the dip coat method and thereafter was heated in the furnace at 110° C. for 20 minutes, thereby obtaining a mixture film of APO and ITO particles.

The refractive index and dispersion of the above mixture films were measured by the spectral ellipsometer (VASE: available from J. A. Woollam. Co., Inc.).

The two-side reflectance and transmittance of the above mixture films were measured by the spectrophotometer (U4000: available from Hitachi, Ltd.).

Using measurements of the reflectance and transmittance of the above mixture films, the absorption-scattering (rate) was calculated according to the equation below.

absorption-scattering (rate)=1−(two-side reflectance)−(transmittance).

Figure 13:
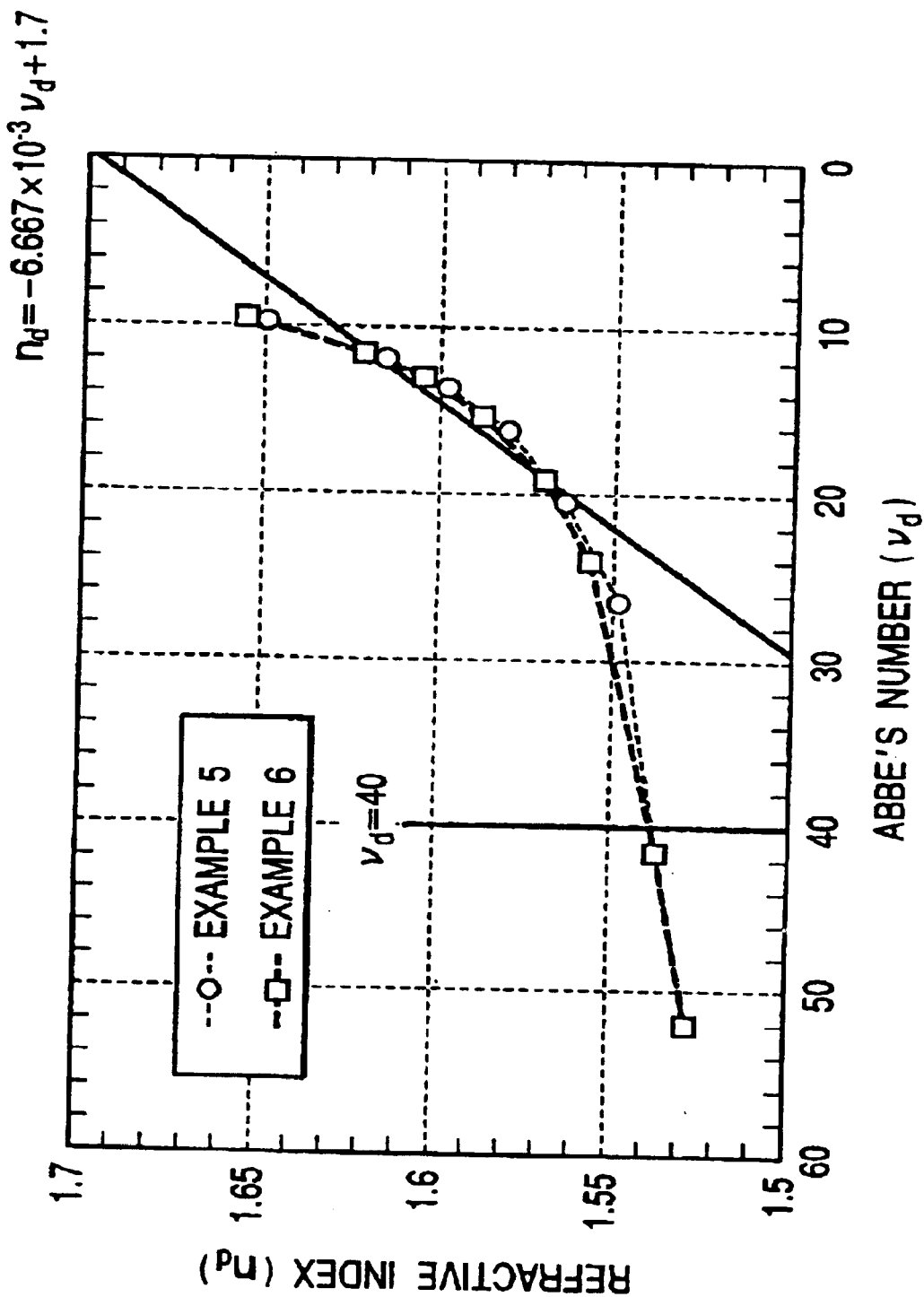
FIG. 13 is a diagram to show the relationship between refractive index and dispersion in Example 5 and Example 6.

The results of the refractive index and dispersion are presented in Table 5 and FIG. 13.

The mixture at the weight ratio of ITO:APO=25:100 had the refractive index and dispersion of $(n_d, v_d)$=(1.548, 26.6), and was off the region of $n_d \leq -6.667 \times 10^{-3} v_d + 1.70$, $v_d \leq 40$.

The mixture had the absorption-scattering (rate) of not more than 0.01 and can be used as an optical film without problems.

The mixtures at the weight ratios of ITO:APO=45:100, 70:100, 100:100, and 135:100 had the refractive index and dispersion of $(n_d, v_d)$=(1.562, 20.5), (1.580, 16.2), (1.598, 13.6), and (1.615, 11.8), respectively, and they were in the region of $n_d \leq -6.667 \times 10^{-3} v_d + 1.70$, $v_d \leq 40$.

The mixtures had the absorption-scattering (rates) of not more than 0.01 and can be used as optical films without problems.

The mixture at the weight ratio of ITO:APO=220:100 had the refractive index and dispersion of $(n_d, v_d)$=(1.650, 9.63), and was off the region of $n_d \leq -6.667 \times 10^{-3} v_d + 1.70$, $v_d \leq 40$.

The chargeability was measured with the electrostatic voltmeter after each sample was wiped twenty times with the wiping fabric (Savina Minimax: available from Kanebo Gosen K.K.). APO alone demonstrated the chargeability of 3 kV, but the mixtures all showed no charge.

[Method 5] Preparation of solution in which ITO particles modified with alkyl group were dispersed 4 g of β-(3, 4 epoxycyclohexyl) ethyltrimethoxysilone wan added to a solution containing 20 g of ITO particles (5 to 20 nm) in 500 g of n-butanol, and thereafter 0.2 ml of 1N hydrochloric acid was added thereto. The mixture was stirred at 25° C. for 24 hours to modify the surface of the particles.

After that, 250 g of xylene was added to the solution and n-butanol was removed by distillation to obtain a xylene solution of ITO particles.

EXAMPLE 6

The surface of particles of ITO $(n_d, v_d=1.8581, 5.53)$ was modified with an alkyl group for enhancing the compatibility with MS $(n_d=1.534)$ according to [Method 3].

The ITO particles and MS $(n_d=1.534)$ were mixed at the weight ratios of ITO:MS=25:100, 45:100, 70:100, 100:100, 135:100, and 220:100 in MEK which was a solvent in which MS was soluble. The percentage of MS to the solvent was 4%. A coating of each of the above solutions was formed on the substrate of BSK7 of Φ49×2 t by the dip coat method and thereafter was heated in the furnace at 80° C. for 20 minutes, thereby obtaining a mixture film of MS and ITO particles.

The refractive index and dispersion of the above mixture films were measured by the spectral ellipsometer (VASE: available from J. A. Woollam. Co., Inc.).

The two-side reflectance and transmittance of the above mixture films were measured by the spectrophotometer (U4000: available from Hitachi, Ltd.).

Using measurements of the reflectance and transmittance of the above mixture films, the absorption-scattering (rate) was calculated according to the equation below.

absorption-scattering (rate)=1−(two-side reflectance)−(transmittance).

The results of the refractive index and dispersion are presented in Table 5 and FIG. 13.

The mixture at the weight ratio of ITO:MS=25:100 had the refractive index and dispersion of $(n_d, v_d)$=(1.555, 24.1), and was off the region of $n_d \leq -6.667 \times 10^{-3} v_d + 1.70$, $v_d \leq 40$.

The mixture had the absorption-scattering (rate) of not more than 0.01 and can be used as an optical film without problems.

The mixtures at the weight ratios of ITO:MS=45:100, 70:100, 100:100, and 135:100 had the refractive index and dispersion of $(n_d, v_d)$=(1.569, 19.2), (1.587, 15.5), (1.604, 13.2), and (1.621, 11.6), respectively, and they were in the region of $n_d \leq -6.667 \times 10^{-3} v_d + 1.70$, $v_d \leq 40$.

The mixtures had the absorption-scattering (rates) of not more than 0.01 and can be used as optical films without problems.

The mixture at the weight ratio of ITO:MS=220:100 had the refractive index and dispersion of $(n_d, v_d)$=(1.655, 9.51), and was off the region of $n_d \leq -6.667 \times 10^{-3} v_d + 1.70$, $v_d \leq 40$.

The chargeability was measured with the electrostatic voltmeter after each sample was wiped twenty times with the wiping fabric (Savina Minimax: available from Kanebo Gosen K.K.). PC alone demonstrated the chargeability of 3 kV, but the mixtures all showed no charge.

EXAMPLE 7

Figure 8:
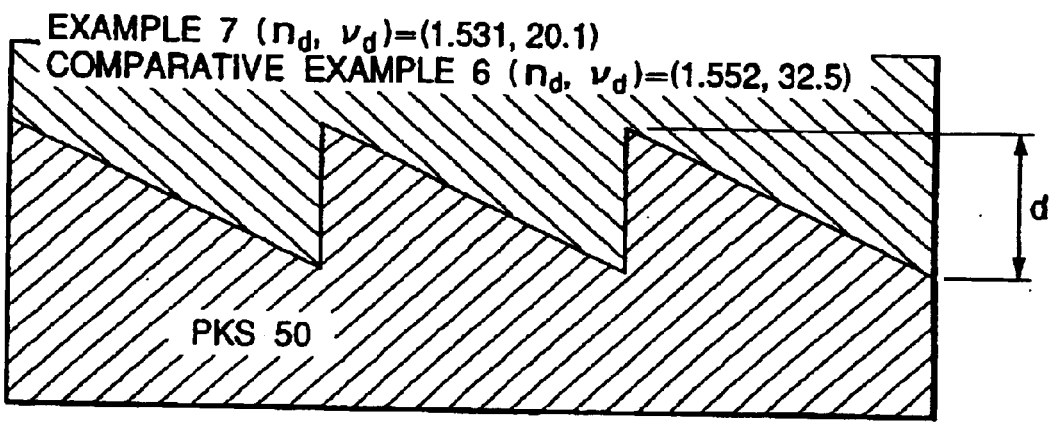
FIG. 8 is a cross-sectional view of the main part of another diffracting optical element.

The optical material adjusted to $(n_d, v_d)$=(1.531, 20.1) by mixing PMMA and ITO particles at the weight ratio of ITO:PMMA=50:100 as described in Example 4, was combined with PSK50: $n_d, v_d)$=(1.5931, 60.9) available from Sumita Kogaku Kogyo, in the structure illustrated in FIG. 8. The height d of the grating was 9.98 μm and the diffraction efficiency was not less than 98% for the light at the wavelengths in the visible region of 400 to 700 nm.

The height of the grating was approximately two thirds of that in Comparative Example 3 and this is advantageous in terms of forming of lens.

The chargeability was measured with the electrostatic voltmeter after the sample was wiped twenty times with the wiping fabric (Savina Minimax: available from Kanebo Gosen K.K.). The sample showed no charge.

Comparative Example 6

The conventional material of p-methoxybenzyl methacrylate; $(n_d, v_d)$=(1.552, 32.5) was combined with PSK50: $(n_d, v_d)$=(1.5938, 60.9). The height d of the grating was 15 μm and the diffraction efficiency was not less than 98% for the light at the wavelengths in the visible region of 400 to 700 nm.

The chargeability was measured with the electrostatic voltmeter after the sample was wiped twenty times with the wiping fabric (Savina Minimax: available from Kanebo Gosen K.K.). The sample showed the charge of 1 kV.

EXAMPLE 8

Example 8 is different from Example 1 in that the $TiO_2$ particles with the refractive index and dispersion of $(n_d, v_d=2.2652, 11.8)$ were used instead of the particles of $Si_x$—$TiO_2$ and the dimethylsilicone resin was used instead of the amorphous fluororesin.

The $TiO_2$ particles, the surface of which was modified with a functional group of dimethylsilicone according to [Method 6] described hereinafter, and the elastomer of dimethylsilicone resin $(n_d=1.43)$ were mixed at the weight ratios of $TiO_2$:dimethylsilicone resin=5:100, 10:100, 20:100, 38:100, 55:100, and 88:100 in n-heptane, which was a solvent in which the elastomer of dimethylsilicone was soluble.

The percentage of the dimethylsilicone resin to the solvent was 4%. A coating of each of the above solutions was formed on the substrate of BK7 of Φ49×2t by the dip coat method and thereafter was heated in the furnace at 150° C. for 20 minutes, thereby obtaining a mixture film of the dimethylsilicone resin and the $TiO_2$ particles.

The refractive index and dispersion of the above mixture films were measured by the spectral ellipsometer (VASE: available from J. A. Woollam. Co., Inc.).

The two-side reflectance and transmittance of the above mixture films were measured by the spectrophotometer (U4000: available from Hitachi, Ltd.).

Using measurements of the reflectance and a transmittance of the above mixture films, the absorption-scattering (rate) was calculated according to the equation below.

absorption-scattering (rate)=1−(two-side reflectance)−(transmittance).

Figure 14:
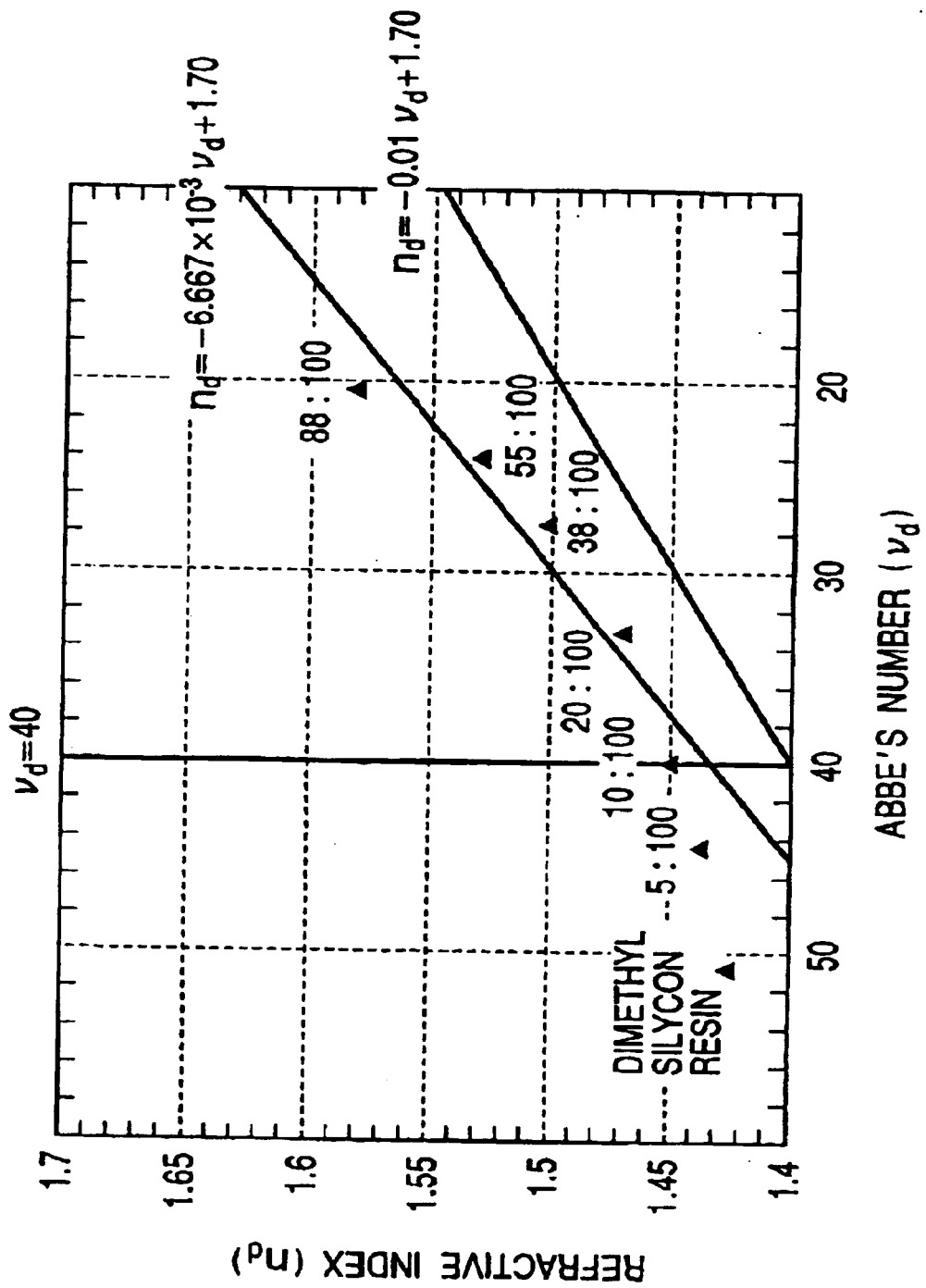
FIG. 14 is a diagram to show the relationship between refractive index and dispersion in Example 8.

The results of the refractive index and dispersion are presented in Table 6 and FIG. 14.

The mixtures at the weight ratios of $TiO_2$:dimethylsilicone resin=5:100 and 10:100 had the refractive index and dispersion of $(n_d, v_d)$=(1.4395, 44.6) and (1.4501, 39.9), respectively, and were off the region of $n_d \leq -6.667 \times 10^{-3} v_d + 1.70$, $v_d \leq 40$.

The mixtures had the absorption-scattering (rates) of not more than 0.01 and can be used as optical films without problems.

The mixtures at the weight ratios of $TiO_2$:dimethylsilicone resin=20:100, 38:100, and 55:100 had the refractive index and dispersion of $(n_d, v_d)$=(1.4713, 33.5), (1.5024, 27.7), and (1.5329, 24.2), respectively, and were within the region of $n_d \leq -6.667 \times 10^{-3} v_d + 1.70$, $v_d \leq 40$.

The mixtures had the absorption-scattering (rates) of not more than 0.01 and can be used as optical films without problems.

The mixture at the weight ratio of $TiO_2$:dimethylsilicone resin=88:100 had the refractive index and dispersion of $(n_d, v_d)$=(1.5824, 20.6), and was off the region of $n_d \leq -6.667 \times 10^{-3} v_d + 1.70$, $v_d \leq 40$.

The mixture had the absorption-scattering (rate) of 0.02.

In this Example 8, the region of $n_d \leq -6.667 \times 10^{-3} v_d + 1.70$, $v_d \leq 40$, was able to be achieved similarly in the weight ratio range of ($TiO_2$:dimethylsilicone resin=) 18:100 to 70:100 by use of the material with the small Abbe's number like the $TiO_2$, particles of $(n_d, v_d)$=(2.2652, 11.8) though the refractive index of the polymer as a host had the refractive index of $n_d$=1.43 larger than that in Example 1.

[Method 6] Preparation of solution in which $TiO_2$ particles modified with functional group of silicone were dispersed.

4 g of the silicone-based surfactant was added to a solution containing 20 g of $TIO_2$ particles (5 to 20 nm) in 500 g of n-butanol, and thereafter 0.2 ml of 1N hydrochloric acid was added thereto. The solution was stirred at 25° C. for 24 hours to modify the surface of the particles.

After that, 250 g of n-heptane was added to the solution and the fractional distillation was conducted at 100° C. to remove n-butanol, and alcohols etc. created by hydrolysis, thereby preparing the n-heptane solution in which the $TiO_2$ particles were dispersed.

The optical materials prepared according to the above method of the present embodiment are used for the optical systems such as image pickup optical systems, and projection optical systems, illumination systems, and so on for the optical devices such as cameras, microscopes, binoculars, and so on.

Each of the above examples permits attainment of the optical materials satisfying the region ($n_d \leq -6.667 \times 10^{-3} v_d + 1.70$, $v_d \leq 40$) or $n_d \leq -0.01 v_d + 1.70$, $v_d \leq 40$ and being indispensable for performance enhancement of the refracting optical systems and stack optical elements, and the optical systems using it.

Particularly, the optical material satisfying the low-index high-dispersion region ($n_d \leq -6.667 \times 10^{-3} v_d + 1.70$, $v_d \leq 40$) can be realized by mixing the low-index material ($n_d \leq 1.45$) with the large-dispersion material ($v_d \leq 25$) as described above.

In that case, the optical material can be one better satisfying the region ($n_d \leq -6.667 \times 10^{-3} v_d + 1.70$, $v_d \leq 40$) where the particles (2 to 100 nm) of the composite metal oxide of titanium and silicon ($Si_x$-$Ti_{(1-x)}O_2$) ($v_d$=24.4) are used as the large-dispersion material, the amorphous fluororesin ($n_d$=1.29 to 1.38) is used as the low-index material, and they are mixed in the weight ratio range of ($Si_x$-$Ti_{(1-x)}$ $O^2$:fluororesin) of 45:100 to 75:100.

Further, the low-index high-dispersion region ($n_d \leq -0.01 v_d + 1.70$, $v_d \leq 40$) can be realized by mixing the low-index material ($n_d \leq 1.40$) with the particles of the large-dispersion material ($v_d \leq 15$).

In that case, the low index and high dispersion tendency is enhanced more where the particles (2 to 100 nm) of $TiO_2$, ($n_d, v_d$=2.2652, 11.8) are used as the large-dispersion material, the amorphous fluororesin ($n_d$=1.29 to 1.38) as the low-index material, and they are mixed in the weight ratio range of ($TiO_2$:fluororesin) of 7:100 to 90:100.

This permits the supply of the optical materials in the region ($n_d \leq -6.667 \times 10^{-3} v_d + 1.70$, $v_d \leq 40$) and in the region ($n_d \leq -0.01 v_d + 1.70$, $v_d \leq 40$) and thus facilitates achievement of higher performance of the optical systems such as the refracting optical systems, the stack optical elements, and so on.

The low-index high-dispersion region ($n_d \leq -6.667 \times 10^{-3} v_d + 1.70$, $v_d \leq 40$) can also be realized by mixing the low-index material ($1.45 \leq n_d \leq 1.55$) with the large-dispersion material ($v_d \leq 10$) as described above.

In that case, the optical material can be one better satisfying the region ($n_d \leq -6.667 \times 10^{-3} v_d + 1.70$, $v_d \leq 40$) where the particles (2 to 100 nm) of ITO ($v_d$=5.53) are used as the large-dispersion material, either polymethyl methacrylate (PMMA, $n_d$=1.48), amorphous polyolefin (APO, $n_d$=1.525), or the copolymer of methyl methacrylate and styrene (MS, $n_d$=1.533) as the low-index material, and they are mixed in the weight ratio range of (ITO:PMMA) of 30:100 to 250:100, in the weight ratio range of (ITO:APO) of 44:100 to 150:100, or in the weight ratio range of (ITO: MS) of 43:100 to 140:100.

This permits the supply of the optical materials in the region ($n_d \leq -6.667 \times 10^{-3} v_d + 1.70$, $v_d \leq 40$) by use of the materials of $1.45 \leq n_d \leq 1.55$ such as PMMA ($n_d$=1.48), APO ($n_d$=1.525), MS ($n_d$=1.533), etc. which are commonly used as optical materials, and thus facilitates achievement of higher performance of the refracting optical systems and stack diffracting optical elements.

At the same time, since ITO is the electroconductive substance, it can reduce the chargeability of the above optical resin materials and thus can suppress decrease of transmitted light and increase of scattered light in the optical systems due of dust or the like.

TABLE 1

|  | Refractive Index and Abbe's Number of SiO$_2$—TiO$_2$ ($n_d$, $v_d$) | Weight Ratio (Si$_x$Ti$_{(1-30)}$O$_3$: Tefron AF) | Refractive Index $n_d$ | Abbe's Number $v_d$ | Absorption/Scattering ($\lambda$ = 500 nm) = 1 − (Transmittance) − Two-side Reflectance) |
|---|---|---|---|---|---|
| Example 1 | 1.703, 24.4 | 18.3:100 | 1.337 | 53.9 | less than 0.005 |
|  |  | 41.1:100 | 1.383 | 41.0 | less than 0.005 |
|  |  | 70.5:100 | 1.427 | 34.9 | less than 0.005 |
|  |  | 88.5:100 | — | — | 0.04 |
| Comparative Example 1 | 1.636, 29.1 | 17.3:100 | 1.329 | 62.1 | less than 0.005 |
|  |  | 38.9:100 | 1.365 | 48.9 | less than 0.005 |
|  |  | 66.7:100 | 1.403 | 42.1 | less than 0.005 |
|  |  | 83.8:100 | — | — | 0.04 |

TABLE 2

|  | Weight Ratio (TiO$_2$:Tefron AF) | Refractive Index $n_d$ | Abbe's Number $v_d$ | Absorption/Scattering ($\lambda$ = 500 nm) = 1 − (Transmittance) − (Two-side Reflectance) |
|---|---|---|---|---|
| Example 2 | 4.5:100 | 1.317 | 48.3 | less than 0.005 |
|  | 9.3:100 | 1.343 | 34.2 | less than 0.005 |
|  | 93:100 | 1.394 | 23.8 | less than 0.005 |
|  | 39:100 | 1.475 | 17.6 | less than 0.005 |
|  | 74:100 | 1.591 | 14.8 | 0.007 |
|  | 120:100 | — | — | 0.06 |

TABLE 3

|  | Weight Ratio (TiO$_2$:Polymer) | Refractive Index $n_d$ | Abbe's Number $v_d$ | Absorption/Scattering ($\lambda$ = 500 nm) = 1 − (Transmittance) − (Two-side Reflectance) |
|---|---|---|---|---|
| Comparative Example 2 | 14.8:100 | 1.564 | 33.0 | less than 0.005 |
|  | 29.6:100 | 1.590 | 23.9 | less than 0.005 |
|  | 59.3:100 | 1.633 | 18.1 | less than 0.005 |
|  | 103.7:100 | 1.691 | 15.2 | 0.007 |

TABLE 4

|  | High Disperse Material and Low Refraction Material, and their index and Abbe's Number ($n_d$, $v_d$) | Weight Ratio (High Disperse Material:Low Refraction Material) | Refractive Index $n_d$ | Abbe's Number $v_d$ | Absorption/Scattering ($\lambda$ 500 nm) = 1 − (Transmittance) − (Two-side Reflectance) |
|---|---|---|---|---|---|
| Example 4 | ITO | 20:100 | 1.5065 | 32.1 | less than 0.005 |
|  | ($n_d$, $v_d$ = 1.8581, 5.53) | 30:100 | 1.5146 | 26.6 | less than 0.005 |
|  | PMMA | 50:100 | 1.5308 | 20.1 | less than 0.005 |
|  | ($n_d$, $v_d$ = 1.490, 57.6) | 120:100 | 1.5705 | 13.2 | less than 0.005 |
|  |  | 200:100 | 1.6093 | 10.2 | less than 0.005 |
|  |  | 300:100 | 1.6471 | 8.65 | 0.01 |
| Comparative Example 4 | TiO$_2$ | 20:100 | 1.5190 | 40.2 | less than 0.005 |
|  | ($N_d$, $v_d$ = 2.265, 11.8) | 50:100 | 1.5847 | 25.9 | less than 0.005 |
|  | PMMA | 85:100 | 1.6300 | 21.7 | less than 0.005 |
|  | ($N_d$, $v_d$ = 1.490, 57.6) | 160:100 | 1.7169 | 17.5 | less than 0.005 |
| Comparative Example 5 | ITO | 20:100 | 1.5961 | 23.2 | less than 0.005 |
|  | ($N_d$, $v_d$ = 1.8581, 5.53) | 50:100 | 1.6137 | 17.5 | less than 0.005 |
|  | PC | 85:100 | 1.6282 | 14.7 | less than 0.005 |
|  | ($N_d$, $v_d$ = 1.58, 30.5) | 160:100 | 1.6569 | 11.4 | less than 0.005 |

TABLE 5

| | High Disperse Material and Low Refraction Material, and their index and Abbe's Number ($n_d$, $v_d$) | Weight Ratio (High Disperse Material:Low Refraction Material) | Refractive Index $n_d$ | Abbe's Number $v_d$ | Absorption/Scattering ($\lambda$ 500 nm) = 1 − (Transmittance) − (Two-side Reflectance) |
|---|---|---|---|---|---|
| Example 5 | ITO $n_d$, $v_d$ = 1.8581, 5.53) APO ($n_d$, $v_d$ = 1.525, 52.1) | 25:100 | 1.548 | 26.6 | less than 0.005 |
| | | 45:100 | 1.562 | 20.5 | less than 0.005 |
| | | 70:100 | 1.580 | 16.2 | less than 0.005 |
| | | 100:100 | 1.598 | 13.6 | less than 0.005 |
| | | 135:100 | 1.615 | 11.8 | less than 0.005 |
| | | 220:100 | 1.650 | 9.63 | 0.01 |
| Example 6 | ITO ($N_d$, $v_d$ = 1.8581, 5.53) MS ($N_d$, $v_d$ = 1.534, 41.5) | 25:100 | 1.555 | 24.1 | less than 0.005 |
| | | 45:100 | 1.569 | 19.2 | less than 0.005 |
| | | 70:100 | 1.587 | 15.6 | less than 0.005 |
| | | 100:100 | 1.604 | 13.2 | less than 0.005 |
| | | 135:100 | 1.621 | 11.6 | less than 0.005 |
| | | 220:100 | 1.655 | 9.51 | 0.01 |

TABLE 6

| | Weight Ratio ($TiO_2$:Dimethyl Silicone) | Refractive Index $n_d$ | Abbe's Number $v_d$ | Absorption/Scattering ($\lambda$ = 500 nm) = 1 − (Transmittance) − (Two-side Reflectance) |
|---|---|---|---|---|
| Example 8 | 5:100 | 1.440 | 44.6 | less than 0.005 |
| | 10:100 | 1.450 | 39.9 | less than 0.005 |
| | 20:100 | 1.471 | 33.6 | less than 0.005 |
| | 38:100 | 1.502 | 27.7 | less than 0.005 |
| | 55:100 | 1.533 | 24.2 | less than 0.005 |
| | 88:100 | 1.582 | 20.6 | 0.02 |

What is claimed is:

1. An optical material which is a mixture of materials comprising a first material having a refractive index of not more than 1.45 for the d-line and a second material having an Abbe number of not more than 25, wherein, with a predetermined ratio of mixture of said first material and second material, a relation between a refractive index for the d-line ($n_d$) and an Abbe number ($v_d$) is defined as follows:

$$n_d < -6.667 \times 10^{-3} v_d + 1.70,$$

wherein said second material comprises particles having a grain size in the range of 2 to 100 nm.

2. An optical material which is a mixture of materials comprising a first material having a refractive index of not more than 1.45 for the d-line and a second material having an Abbe number of not more than 25, wherein, with a predetermined ratio of mixture of said first material and second material, a relation between a refractive index for the d-line ($n_d$) and an Abbe number ($v_d$) is defined as follows:

$$n_d \leq -6.667 \times 10^{-3} v_d + 1.70,$$

wherein said first material is an amorphous fluororesin.

3. An optical material which is a mixture of materials comprising a first material having a refractive index of not more than 1.45 for the d-line and a second material having an Abbe number of not more than 25, wherein, with a predetermined ratio of mixture of said first material and second material, a relation between a refractive index for the d-line ($n_d$) and an Abbe number ($v_d$) is defined as follows:

$$n_d \leq -6.667 \times 10^{-3} v_d + 1.70,$$

wherein said second material is particles of a composite metal oxide of titanium and silicon ($Si_x$—$Ti_{(1-x)}O_2$) having an Abbe number ($v_d$) of 24.4.

4. An optical material which is a mixture of materials comprising a first material having a refractive index of not more than 1.45 for the d-line and a second material having an Abbe number of not more than 25, wherein, with a predetermined ratio of mixture of said first material and second material, a relation between a refractive index for the d-line ($n_d$) and an Abbe number ($v_d$) is defined as follows:

$$n_d \leq -6.667 \times 10^{-3} v_d + 1.70,$$

wherein said first material is an amorphous fluororesin, said second material is particles of a composite metal oxide of titanium and silicon ($Si_x$—$Ti_{(1-x)}O_2$) having an Abbe number ($v_d$) of 24.4, and a weight ratio of said particles and said amorphous fluororesin is in the range of 45:100 to 75:100.

5. An optical material which is a mixture of materials comprising a first material having a refractive index of not more than 1.45 for the d-line and a second material having an Abbe number of not more than 25, wherein, with a predetermined ratio of mixture of said first material and second material, a relation between a refractive index for the d-line ($n_d$) and an Abbe number ($v_d$) is defined as follows:

$$n_d \leq -6.667 \times 10^{-3} v_d + 1.70,$$

wherein said first material is a dimethylsilicone resin.

6. An optical material which is a mixture of materials comprising a first material having a refractive index of not more than 1.45 for the d-line and a second material having an Abbe number of not more than 25, wherein, with a predetermined ratio of mixture of said first material and second material, a relation between a refractive index for the d-line ($n_d$) and an Abbe number ($v_d$) is defined as follows:

$$n_d \leq -6.667 \times 10^{-3} v_d + 1.70,$$

where said second material comprises particles of titanium oxide ($TiO_2$).

7. An optical material which is a mixture of materials comprising a first material having a refractive index of not more than 1.45 for the d-line and a second material having an Abbe number of not more than 25, wherein, with a predetermined ratio of mixture of said first material and second material, a relation between a refractive index for the d-line ($n_d$) and an Abbe number ($v_d$) is defined as follows:

$$n_d \leq -6.667 \times 10^{-3} v_d + 1.70,$$

wherein said first material is a dimethylsilicone resin, said second material is particles of titanium oxide ($TiO_2$), and a weight ration of said titanium oxide and said dimethylsilicone resin is in the range of 18:100 to 70:100.

8. An optical material which is a mixture of materials comprising a first material having a refractive index of not more than 1.40 for the d-line and a second material having an Abbe number of not more than 15, wherein, with a predetermined ratio of mixture of said first material and second material, a relation between a refractive index for the d-line ($n_d$) and an Abbe number ($v_d$) is defined as follows:

$$n_d \leq -0.01 v_d + 1.70,$$

wherein said second material comprises particles having a grain size in the range of 2 to 100 nm.

9. An optical material which is a mixture of materials comprising a first material having a refractive index of not more than 1.40 for the d-line and a second material having an Abbe number of not more than 15, wherein, with a predetermined ratio of mixture of said first material and second material, a relation between a refractive index for the d-line ($n_d$) and an Abbe number ($v_d$) is defined as follows:

$$n_d \leq -0.01 v_d + 1.70,$$

wherein said first material comprises an amorphous fluororesin.

10. An optical material which is a mixture of materials comprising a first material having a refractive index of not more than 1.40 for the d-line and a second material having an Abbe number of not more than 15, wherein, with a predetermined ratio of mixture of said first material and second material, a relation between a refractive index for the d-line ($n_d$) and an Abbe number ($v_d$) is defined as follows:

$$n_d \leq -0.01 v_d + 1.70,$$

wherein said second material comprises particles of titanium oxide ($TiO_2$).

11. An optical material which is a mixture of materials comprising a first material having a refractive index of not more than 1.40 for the d-line and a second material having an Abbe number of not more than 15, wherein, with a predetermined ratio of mixture of said first material and second material, a relation between a refractive index for the d-line ($n_d$) and an Abbe number ($v_d$) is defined as follows:

$$n_d \leq -0.01 v_d + 1.70,$$

wherein said first material is an amorphous fluororesin, said second material is particles of titanium oxide ($TiO_2$), and a weight ratio of said titanium oxide and said amorphous fluororesin is in the range of 7:100 to 90:100.

12. An optical material which is a mixture of materials comprising a first material having a refractive index for the d-line in the range of 1.45 to 1.55, both inclusive, and a second material having an Abbe number of not more than 10, wherein, with a predetermined ratio of mixture of said first material and second material, a relation between a refractive index for the d-line ($n_d$) and an Abbe number ($v_d$) is defined as follows:

$$n_d \leq -6.667 \times 10^{-3} v_d + 1.70,$$

wherein said second material comprises particles having a grain size in the range of 2 to 100 nm.

13. An optical material which is a mixture of materials comprising a first material having a refractive index for the d-line in the range of 1.45 to 1.55, both inclusive, and a second material having an Abbe number of not more than 10, wherein, with a predetermined ratio of mixture of said first material and second material, a relation between a refractive index for the d-line ($n_d$) and an Abbe number ($v_d$) is defined as follows:

$$n_d \leq -6.667 \times 10^{-3} v_d + 1.70,$$

wherein said second material is ITO (indium-tin-oxide).

14. An optical material which is a mixture of materials comprising a first material having a refractive index for the d-line in the range of 1.45 to 1.55, both inclusive, and a second material having an Abbe number of not more than 10, wherein, with a predetermined ratio of mixture of said first material and second material, a relation between a refractive index for the d-line ($n_d$) and an Abbe number ($v_d$) is defined as follows:

$$n_d \leq -6.667 \times 10^{-3} v_d + 1.70,$$

wherein said first material is polymethyl methacrylate.

15. An optical material which is a mixture of materials comprising a first material having a refractive index for the d-line in the range of 1.45 to 1.55, both inclusive, and a second material having an Abbe number of not more than 10, wherein, with a predetermined ratio of mixture of said first material and second material, a relation between a refractive index for the d-line ($n_d$) and an Abbe number ($v_d$) is defined as follows:

$$n_d \leq -6.667 \times 10^{-3} v_d + 1.70,$$

wherein said first material is polymethyl methacrylate, said second material is particles of ITO (indium-tin-oxide), and a weight ratio of said particles and said polymethyl methacrylate is in the range of 30:100 to 250:100.

16. An optical material which is a mixture of materials comprising a first material having a refractive index for the d-line in the range of 1.45 to 1.55, both inclusive, and a second material having an Abbe number of not more than 10, wherein, with a predetermined ratio of mixture of said first material and second material, a relation between a refractive index for the d-line ($n_d$) and an Abbe number ($v_d$) is defined as follows:

$$n_d \leq -6.667 \times 10^{-3} v_d + 1.70,$$

wherein said first material is an amorphous polyolefin.

17. An optical material which is a mixture of materials comprising a first material having a refractive index for the d-line in the range of 1.45 to 1.55, both inclusive, and a second material having an Abbe number of not more than 10, wherein, with a predetermined ratio of mixture of said first material and second material, a relation between a refractive index for the d-line ($n_d$) and an Abbe number ($v_d$) is defined as follows:

$$n_d \leq -6.667 \times 10^{-3} v_d + 1.70,$$

wherein said first material is an amorphous polyolefin, said second material is particles of ITO (indium-tin-oxide), and a weight ratio of said particles and said amorphous polyolefin is in the range of 44:100 to 150:100.

18. An optical material which is a mixture of materials comprising a first material having a refractive index for the d-line in the range of 1.45 to 1.55, both inclusive, and a second material having an Abbe number of not more than 10, wherein, with a predetermined ratio of mixture of said first material and second material a relation between a refractive index for the d-line ($n_d$) and an Abbe number ($v_d$) is defined as follows:

$$n_d \leq -6.667 \times 10^{-3} v_d + 1.70,$$

wherein said first material is a copolymer of methyl methacrylate and styrene.

19. An optical material which is a mixture of materials comprising a first material having a refractive index for the d-line in the range of 1.45 to 1.55, both inclusive, and a second material having an Abbe number of not more than 10, wherein, with a predetermined ratio of mixture of said first material and second material, a relation between a refractive index for the d-line ($n_d$) and an Abbe number ($v_d$) is defined as follows:

$$n_d \leq -6.667 \times 10^{-3} v_d + 1.70,$$

wherein said first material is a copolymer resin of methyl methacrylate and styrene, said second material is particles of ITO (indium-tin-oxide), and a weight ratio of the particles and said copolymer resin is in the range of 43:100 to 140:100.

20. A method for producing an optical material, comprising a step of decreasing a filling factor of a first material, and a step of filling gaps of the first material of the decreased filling factor with a second material having an Abbe number different from that of the first material, thereby producing an optical material having a desired refractive index and an Abbe number.

21. An optical member comprising the material produced by the production method as set forth in claim 20.

22. An optical system comprising the optical member of claim 21.

23. The optical system of claim 22, wherein said optical member is a diffracting optical element.

24. An optical device comprising the optical system of claim 22, or 23.

* * * * *

UNITED STATES PATENT AND TRADEMARK OFFICE
CERTIFICATE OF CORRECTION

PATENT NO. : 6,759,471 B1
DATED : July 6, 2004
INVENTOR(S) : Hideo Ukuda

It is certified that error appears in the above-identified patent and that said Letters Patent is hereby corrected as shown below:

Drawings,
Sheet 13, Figure 14, "SILYCON" should read -- SILICONE --.

Column 1,
Line 37, "e.g. SPIE" should read -- e.g., SPIE --.
Line 59, "Struc" should read -- struc --.
Line 67, "then" should read -- than --.

Column 2,
Line 18, "No. 09-127321" should read -- No. 9-127321 --.
Line 32, "etc. In" should read -- etc. in --.
Line 47, "Publication Laid-Open No. 6-16450" should read -- Application Laid-Open No. 6-16450 --.
Line 53, "2-ethozy-ethyl" should read -- 2-ethoxy-ethyl --.

Column 3,
Line 1, "region,.of" should read -- region, of --.
Lines 20 and 26, "$O_2$" should read -- $O_2$) --.
Line 30, "inthird" should read -- third --.

Column 5,
Line 54, "Example 1:" should read -- Example 1; --.

Column 6,
Line 29, "$\chi^j$" should read -- $\chi^1$ --.
Line 41, "<40" should read -- $\leq 40$ --.

Column 7,
Line 62, "an" should read -- on --.

Column 8,
Line 11, "($n_d$1.38)" should read -- ($n_d$=1.38) --.
Line 14, "$TiO_2$," should read -- $TiO_2$ --.
Line 16, "$BaTiO_3$," should read -- $BaTiO_3$ --.
Line 63, "6.667" should read -- 6.667 --.

Column 9,
Lines 25 and 27, "$TiO_2$," should read -- $TiO_2$ --.
Line 36, "In" should read -- in --.

UNITED STATES PATENT AND TRADEMARK OFFICE
CERTIFICATE OF CORRECTION

PATENT NO. : 6,759,471 B1
DATED : July 6, 2004
INVENTOR(S) : Hideo Ukuda

It is certified that error appears in the above-identified patent and that said Letters Patent is hereby corrected as shown below:

Column 9 (cont'd),
Lines 37 and 63, "6.667" should read -- -6.667 --.
Line 40, "$v_b$" should read -- $v_d$ --.

Column 10,
Line 19, "with" should read -- with PMMA. --.
Line 21, "6.667" should read -- -6.667 --.

Column 11,
Line 18, "$n_d$" should read -- $(n_d$ --.
Line 22, "film" should read -- films --.

Column 12,
Line 11, "180C" should read -- 180°C --.
Line 19, "U1000" should read -- U4000 --.
Line 42, "$TiO_2$," should read -- $TiO_2$, --.
Line 48, "$(C_4F_9)$" should read -- $(C_4F_9)_3N$ --.
Line 63, "is" should be deleted.

Column 13,
Line 19, "reflective" should read -- refractive -- and "$V_d$" should read -- $v_d$ --.
Line 37, "N-3" should read -- N-(3 --.
Lines 39 and 48, "$TiO_2$," should read -- $TiO_2$ --.
Line 57, "DK7" should read -- BK7 --.

Column 14,
Line 16, "$TiO_2$," should read -- $TiO_2$ --.
Line 43, "1.9581" should read -- 1.8581 --.

Column 15,
Line 20, "6.667" should read -- $-6.667 \times 10^{-3} v_d + 1.70$, --.
Line 23, "Kanabo" should read -- Kanebo -- .
Line 26, "articles" should read -- particles --.
Line 39, "$(n_d>1.29)$" should read -- $(n_d=1.29)$ --.
Line 63, "$n_d$" should read -- $(n_d$ --.
Line 65, "$v_d \leq$" should read -- $v_d \leq 40$ --.

Column 16,
Line 5, "$TiO_2$," should read -- $TiO_2$ --.
Line 7, "γ-methacryloxpropyltrimethoxysilane" should read
-- γ-methacryloxypropyltrimethoxysilane --.

UNITED STATES PATENT AND TRADEMARK OFFICE
CERTIFICATE OF CORRECTION

PATENT NO. : 6,759,471 B1
DATED : July 6, 2004
INVENTOR(S) : Hideo Ukuda

It is certified that error appears in the above-identified patent and that said Letters Patent is hereby corrected as shown below:

Column 16 (cont'd),
Line 16, "(($n_d$=1.59)" should read -- ($n_d$=1.59) --.
Line 17, "(($n_d$ =1.48)" should read -- ($n_d$=1.48) --.

Column 17,
Line 34, "ethyltrimethoxysilone" should read -- ethyltrimethoxysilane --.
Line 35, "wan" should read -- was --.
Line 53, "BSK7" should read -- BK7 --.

Column 18,
Line 18, "$v_d$" should read -- $v_d$) --.
Line 30, "$n_d,v_d$)=(1.5931" should read -- ($n_d,v_d$)=(1.5938 --.
Line 46, "late;" should read -- late: --.

Column 19,
Line 43, "$v_d$,)" should read -- $v_d$) --.
Lines 50 and 57, "$TiO_2$," should read -- $TiO_2$ --.

Column 20,
Line 2, "on for" should read -- on, or for --.
Line 24, "$O^2$" should read -- $O_2$ --.
Line 30, "$TiO_2$," should read -- $TiO_2$ --.
Line 67, "due" should read -- due to attachment --.

Column 21,
Line 5, (Table 1), "1-30" should read -- 1-x --, and "$O_3$" should read -- $O_2$ --.
Line 12, (Table 1), "1.365" should read -- 1.366 --.
Line 26, (Table 2), "93" should read -- 19 --.
Line 27, (Table 2), "1.475 17.6" should read -- 1.478 17.8 --.
Lines 59, 61, 63 and 65, (Table 4), "$N_d$" should read -- $n_d$ --.

Column 23,
Line 10, "$n_d,v_d$" should read -- ($n_d,v_d$) -- and "1.8581" should read -- (1.8581 --.
Line 12, "$v_d$" should read -- $v_d$) --, and "1.525" should read -- (1.525 --.
Line 16, "($N_d,v_d$ = 1.8581" should read -- ($n_d,v_d$) = (1.8581 --.
Line 17, "15.6" should read -- 15.5 --.
Line 18, "($N_d,v_d$=1.534" should read -- ($n_d,v_d$) = (1.534 --.
Line 41, "<" should read -- $\leq$ --.

UNITED STATES PATENT AND TRADEMARK OFFICE
CERTIFICATE OF CORRECTION

PATENT NO. : 6,759,471 B1
DATED : July 6, 2004
INVENTOR(S) : Hideo Ukuda

It is certified that error appears in the above-identified patent and that said Letters Patent is hereby corrected as shown below:

Column 25,
Line 12, "ration" should read -- ratio --.

Column 27,
Line 6, "material a" should read -- material, a --.

Column 28,
Line 20, "22, or 23" should read -- 22 or 23 --.

Signed and Sealed this

Eighth Day of November, 2005

JON W. DUDAS
*Director of the United States Patent and Trademark Office*